United States Patent
Seidner

(10) Patent No.: US 11,345,860 B2
(45) Date of Patent: *May 31, 2022

(54) SYSTEM AND METHOD FOR CONTINUOUS PRODUCTION OF A RENEWABLE LIQUID FUEL

(71) Applicant: Marc A. Seidner, Los Angeles, CA (US)

(72) Inventor: Marc A. Seidner, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/301,218

(22) Filed: Mar. 29, 2021

(65) Prior Publication Data

US 2021/0214617 A1   Jul. 15, 2021

Related U.S. Application Data

(63) Continuation-in-part of application No. 16/542,024, filed on Aug. 15, 2019, now Pat. No. 10,961,459.

(60) Provisional application No. 62/720,097, filed on Aug. 20, 2018.

(51) Int. Cl.
| | |
|---|---|
| *C10B 53/02* | (2006.01) |
| *C10L 5/44* | (2006.01) |
| *C10L 9/08* | (2006.01) |
| *C10G 1/04* | (2006.01) |
| *C10B 47/32* | (2006.01) |
| *C10B 57/14* | (2006.01) |
| *C10L 1/32* | (2006.01) |

(52) U.S. Cl.
CPC .............. *C10B 53/02* (2013.01); *C10B 47/32* (2013.01); *C10B 57/14* (2013.01); *C10G 1/045* (2013.01); *C10L 1/32* (2013.01); *C10L 5/447* (2013.01); *C10L 9/083* (2013.01); *C10L 9/086* (2013.01); *C10G 2300/1011* (2013.01)

(58) Field of Classification Search
CPC .. C10L 9/083; C10L 9/086; C10L 1/32; C10L 1/322; C10L 1/324; C10L 1/326; C10L 1/328; C10B 53/02; C10B 53/08; C10B 47/14; C10B 47/22; C10B 47/24; C10B 49/08; C10B 49/10
See application file for complete search history.

(56) References Cited

U.S. PATENT DOCUMENTS

| | | | | |
|---|---|---|---|---|
| 2,623,011 A | * | 12/1952 | Wells | C10B 47/22 201/34 |
| 2,717,865 A | * | 9/1955 | Kimberlin, Jr. | C10G 9/28 208/126 |
| 3,776,150 A | * | 12/1973 | Evans | C10B 53/00 110/346 |
| 8,637,718 B2 | * | 1/2014 | Gupta | C10G 1/02 585/242 |
| 9,758,738 B2 | * | 9/2017 | Seidner | C10L 10/02 |
| 10,961,459 B2 | * | 3/2021 | Seidner | C10L 9/083 |

(Continued)

OTHER PUBLICATIONS

"About biocarbon", BioCarb+, URL: https://www.sintef.no/projectweb/biocarb/aboutbiocarbon/.*

(Continued)

*Primary Examiner* — Jonathan Luke Pilcher
(74) *Attorney, Agent, or Firm* — Fitzgerald IP Law; John K Fitzgerald, Esq.

(57) ABSTRACT

A system and method for torrefying a combination of biomass and biochar colloidal dispersion is provided.

16 Claims, 13 Drawing Sheets

(56) References Cited

U.S. PATENT DOCUMENTS

| | | | | |
|---|---|---|---|---|
| 2010/0162619 | A1* | 7/2010 | Peus | F28D 1/06 |
| | | | | 44/605 |
| 2011/0179703 | A1* | 7/2011 | Gupta | C10L 9/086 |
| | | | | 202/84 |
| 2016/0137939 | A1* | 5/2016 | Seidner | C10L 1/322 |
| | | | | 44/280 |

OTHER PUBLICATIONS

"About biocarbon", climate solutions, URL: https://www.climatesolutions.org/about-biocarbon.*

* cited by examiner

SYSTEM AND METHOD FOR CONTINUOUS PRODUCTION OF A RENEWABLE LIQUID FUEL

BACKGROUND

The present invention relates generally to fuels derived from processed biomass, and more particularly to fuels that are a colloidal dispersion of heat-treated charred biomass generally processed in the absence of oxygen that can be used as substitutes for, or additives to, fluid bio-oil based fuels, and fluid petrochemical fuels.

It is widely recognized that the majority of energy produced throughout the industrialized world is based on the consumption of petroleum based liquid fuels. Such fuels have a high energy density, are relatively easy to transport and store, and can be used in a wide variety of engines and heaters. However, as is common knowledge, the in-ground stores of petroleum based products are rapidly declining, and experts predict that new discoveries are not occurring frequently enough to offset the rapid drawdown of currently known reserves. In the parlance of today, these resources are considered to be non-renewable. Furthermore, use of these non-renewable resources are believed to produce climate changes and more immediately identified local environmental effects commonly associated with increased fouling of air and water and are generally considered pollution inducing and having a negative effect on the environment.

Various attempts have been made to identify renewable sources of energy that can be used in place of petroleum based fuels. For example, electricity can be generated using such renewable energy sources as wind, solar, geothermal and hydroelectric. While these energy sources are considered "clean" or "green" because they are renewable, relatively non-polluting, and are thought to produce a minimal to no carbon footprint or reduced emission profile on the environment from their use, they each have drawbacks due to location, convertibility, space, and wind and water availability. Essentially, these renewable resources are not always found in sufficient commercially available amounts in the locations where they are needed to enable their substitution for all commercially used non-renewable resources.

Coal is another source of energy that is widely used, but which is neither clean nor renewable. While advancements in technology have made the use of coal cleaner with less residual ash and lower atmospheric emission, coal cannot be used in all applications, particularly where use of liquid fuel is advantageous. Although coal can be processed into a water-based slurry, such a slurry cannot be used where a low water content fuel is needed to avoid emission of certain oxides and/or other pollutants, or where the water will cause damage to the equipment being powered by the combustion of the coal slurry.

Furthermore, coal slurry or fluid dispersions of coal still do not overcome the detrimental environmental effects caused by the combustion of coal for heat or energy generation. The type of coal typically used today, called steam coal, or sub-bituminous coal, is not pure, and includes a mixture of harmful heavy metals such as mercury and lead, toxins or other minerals such as sulfur that, when combusted, tend to adversely affect the combustion equipment and at the same time disperse into the air and water resulting in potentially harmful effects on people and the environment.

In view of the problems of using coal and petroleum derivatives to generate energy, various technologies have evolved to utilize renewable sources of energy from natural plant material through cultivation or natural growth and regeneration of woody based, grass based or cultivated vegetable based plant materials, such as wood chips, agricultural by-products, cultivated crops or harvested naturally growing plants and the like. However, unless these materials are handled in a particular manner which includes their being dried and processed bundled, chipped, pelletized, cubed, or baled or heat treated, such unprocessed natural plant products, commonly called "biomass," are difficult to use as fuel. The unprocessed biomass is typically either too wet, too cumbersome or costly to handle and transport, too prone to decomposition or rot when in a stockpile, too bulky and difficult to feed into conventional heat or energy generation equipment, or are simply too full of non-combustible, non-natural fiber materials, or contaminants such as metal, plastic, sand, gravel, dirt or other ash causing products to effectively bring them from the field, farm or forest directly to a heat or power generating plant for use.

All solid fuels power plants, including coal and biomass power plants are typically designed, engineered and built to use one type or class of fuel and are not easily reconfigured to change from one fuel type to another. For example, coal fired power plants cannot burn biomass without expensive and major engineering changes in their operation systems, usually rendering them unable to revert to coal once the changes to permit biomass combustion have been made. Biomass power plants using certain types of woody based fiber including wood chips in a specifically designed boiler system cannot be fed into the system alongside curbside garden variety aggregated biomass or crop generated by-products without special handling and pre-processing of the alternative fuels. Furthermore these natural cellulosic materials are comprised of a variety of differing cellular mechanical structures and chemical bonds which create their own sets of problems with respect to reduction of moisture content, management of size reduction or alteration, and particle production and handling to permit suitable commercial feeding as a fuel into conventional biomass heat or energy generating equipment.

The handling of biomass is problematic, and typically requires that a dedicated biomass generation plant be specially engineered to use certain specific types of biomass fuels. As discussed above, the biomass fuel type used in such a generation plant is typically not interchangeable with another type of biomass fuel. Biomass can be aggregated, chipped or chopped, ground up, dried and burned, but not all biomass can be mixed and processed homogenously, dried and burned with the same equipment and in the same manner. In addition, raw, unprocessed biomass type fuels (even if they have undergone a preliminary process, such as chipping or shredding) are not easily convertible or reducible into smaller more manageable and uniformly sized particles due to their inherent diverse ligno-cellulosic chemical and mechanical cellular bonds.

Consumption of biomass for the production of heat is one of the oldest processes known to man, and the production of energy from heat to steam to electricity is also well established. However, as society focuses its concern on the environment and air and water quality, it has been recognized that the combustion of conventional biomass, even if plainly dried and burned, releases chemical components such as volatile organic compounds (VOC's) and particulate matter generated during the combustion process that tends to foul the air and fill it with smoke, dust and ash.

Conventional biomass fiber fueled plants have become very costly and time consuming to build because they must be engineered and designed to consume biomass of a certain nature and to mitigate particulate and volatile organic compound emissions resulting from the burning of biomass. Furthermore, these plants must operate on a 24 hour basis daily, year in and year out in order to be cost effective producers of green clean energy and clean heat. They cannot simply start and stop at will, and are therefore used to produce electrical energy known as 'base-load' or 'firm base' energy. They produce energy that costs the same whether it is produced at 3:00 AM or at 2:00 PM. However, it is well known that nighttime energy is less valuable than peak daytime energy.

Accordingly, the economics of biomass power plants are problematic because they do not fit all situations of affordable biomass consumption or timely electrical demand. Furthermore, these types of plants are fixed in location and not mobile and because of the heavy nature of their construction are set into concrete and steel, hard wired and plumbed into power grid transformer stations, permitted in one area to operate, permitted for one type of fuel and one type of ash output. They are also typically constructed proximate to a biomass fuel supply for which they are engineered, and which is generally located not more than an eighty to one hundred mile radius from the plant. In some circumstances, the biomass fuel supply is not even available year round, but is seasonally harvested, grown or aggregated.

One problem that has not yet been overcome simply by air drying or evaporative heating of the biomass until the biomass has a moisture content considered dry enough to combust, for example, under five (5) percent but generally less than 25%, is that all unprocessed and not specifically heat-treated biomass is hydroscopic and hydrophilic. Dry biomass will not stay at the same moisture content if exposed to humidity or weather. If it is dry, it will absorb moisture and become wet once again. Whether or not the moisture is cellular moisture or surface moisture, the water has a negative effect on the heat output of combusting biomass, as water is an extinguishing media that prevents or materially slows biomass combustion. Consequently, all unprocessed air dried or evaporative dried biomass that is non-specifically heat-treated will absorb ambient moisture.

Moreover, biomass dispersed into moisture laden fluids will absorb fluid and may prevent the biomass from being a suitable heat or energy generating fuel. Even when the biomass is air or evaporative dried mechanically or otherwise, lignin and cellulose fiber bound together in the dry biomass are hydrophilic and that allows the biomass to wick up and hold moisture thereby negatively impacting the combustion capability of the fuel product. In such cases, the biomass may require some form of pre-heating or re-drying immediately prior to or along with combustion.

Furthermore, and most significantly, the mechanically and chemically bound lignin and cellulose in biomass are not easily broken down sufficiently even through air drying and evaporative mechanical drying to allow the biomass to be cost effectively and commercially reduced in size and consistent character, such as, for example, into a finely ground powder or even into minute micro or nano particulate sizes amenable to forming a slurry, suspension or liquid solution or a colloidal dispersion. Without changing the chemical and mechanical nature of the biomass through specifically designed heat-treating processes, the biomass within the slurry, suspension, liquid solution or colloidal dispersion will remain hydrophilic and will retain the original inherent chemical and vegetative compounds that contribute to VOC and particulate emission pollution when the biomass is combusted.

Recently, various technologies for heat-treating and processing biomass have been developed which serve to alter the character of the biomass in a manner so as to provide a processed specially heat-treated biomass derived material for fuels that is hydrophobic and resists moisture wick up and absorption. These technologies remove VOC's and cellular particulate matter from the biomass, such as, for example, hemicellulose, that produces smoke and harmful emissions on combustion, and impart a hydrophobic, friable condition to the remaining heat-treated biomass which can be more easily and cost effectively processed into smaller particles that are fine enough to form a colloidal dispersion when mixed with a fluid type carrier.

Use of these technologies reduces the weight of the biomass feedstock product, increases the entrained energy density per pound of the remaining product, and creates a homogenous dry solid that can be pressed into a pelletized or cubed product which can be transported over long distances to plant locations where the processed solid biomass fuels can be stored, managed and consumed more cost effectively than unprocessed pelletized or chipped biomass. These process treatments also result in a product that is able to burn transparently with coal in un-modified coal fired power plants or in conventional biomass power plants. The mix of biomass feedstock used to produce the end-processed product is not identifiable in the final heat treated product because it becomes homogeneous, both in appearance and energy content.

One method involving specialty heat treating of biomass is known as torrefaction. There are several known methods of torrefaction characterized by the method and type of equipment and handling of the biomass furnished product. Torrefaction is characterized by roasting a raw biomass for a certain time and using a particular temperature curve in the absence of oxygen so as to prevent combustion of the biomass, remove hemicellulose and VOC's and moisture, to create a carbonized fuel product that has certain desirable characteristics which exceed those found in ordinary unprocessed biomass.

Supertorrefaction, or fast flash torrefaction, is a technology that, as its name implies, results in achieving an intermediate or end product much more rapidly than other methods. To effectively produce an acceptable end product, supertorrefaction requires the biomass feedstock to be pre-processed to reduce moisture in the feedstock and to ensure that the feedstock particles are appropriately sized before further higher temperature heat processing. The pre-processed biomass is then heated with heat transfer fluid agents such as heat transfer oils, mineral oils or organic molten salts through a heat exchanger during the supertorrefaction process.

Torrefaction involves a thermochemical treatment of previously air dried or moisture evaporated biomass at temperatures generally in the range of 250 to 350° C. for a specified time. The time and temperature may be varied depending on the type of biomass, its particle size, consistency of mix of furnish, type of chemical and mechanical bonds of the cellulose and lignin present. The biomass, which is typically woody based and generally having a pre-processing moisture content of less than 15-25%, is specifically heat-treated, roasted and charred in the absence of oxygen until it breaks the lignocellulosic bonds, removes the VOC's and hemi-cellulose, burns off or gasifies some minerals, chemicals and ultimately chars and embrittles the mix of lignin and carbon fiber.

Using the torrefaction process, a desirable furnish product can be created in a cost effective and appropriately commercial operating manner. Not all torrefaction technologies are suitable and not all automatically result in a desirable output product. When the processing is properly done, water contained in the biomass, as well as superfluous volatiles, primarily alcohols and hemicellulose, are released at lower temperatures and the biopolymers in the biomass, such as, for example, higher temperature burning oils, cellulose, and lignin remain. The process essentially fractures chemical and mechanical bonds, partly decomposing the biomass, which gives off various types of volatiles, low alcohols in gas form, some simple ash components and reducing or removing or changing the character of certain minerals, salts from the resulting treated product.

The final torrefied biochar output product is a carbonized or charred solid (not a charcoal), relatively dry (average 2-5% moisture content or less), and blackened into a torrefied biocarbon or bio-char material that retains carbon, carbonized lignin, some lower oils, some traces of minerals, some gases, and some ash. The final product is hydrophobic and brittle, rendering it easily friable and suitable for pulverizing into a fine powder, and retains an energy content that is typically in the range of 9,500 BTUs per pound and 10,500 BTUs per pound. Under some time and temperatures, the energy density can exceed 12,000 BTUs per pound.

Since the torrefied biocarbon or biochar product is hydrophobic, it repels water and can be stored outdoors in most every outside climate condition including moist air or rain without any appreciable wick up change in moisture content or reduction of heating value, unlike the raw biomass from which it is made.

Moreover, given the torrefied biocarbon or biochar may be easily and cost effectively reduced to a finely ground and pulverized powder in micron, submicron and nano sized particles. Normally, this carbonized product would be pelletized or cubed for handling, storage and for eventual transport. As a cubed or pelletized product it can be compressed and densified to a higher bulk and energy density than raw biomass pellets or chips, and transported over greater distances at a lower cost than conventional biomass fuels and it can be combusted in any conventional biomass power plant, or for heat or for energy in any unmodified coal fired power plants. Leaving torrefied biochar in an unpelletized or uncubed state may allow undesirable dust to float in the air, which may create a nuisance storage condition. Excessive dust from carbonized product can create an unwanted accumulation of torrefied dust particles which in a confined storage space may result in a combustible or explosive dust-air mixture.

The char process may be altered to accommodate biomass types having a moisture content of, for example, 30-45% or greater. For example, while heat-treatment torrefication of much drier biomass fiber is done at essentially low pressure or atmospheric pressure, a similar process resulting in similar if not an identical finished biochar end product may be obtained using a process known as hydrothermal carbonization, or HTC.

The HTC process also heats the biomass but in the absence of oxygen and at a lower temperature and often with a longer exposure to heat, but at pressures of up to 700 psi or greater in an autoclave type environment. The resulting end product splits the raw biomass into a water laden liquid phase and a cellulosic lignin and carbon laden phase. This process also separates certain salts and other minerals and chemicals that can be diverted in the liquid phase from the cellulosic carbon minerals in the solid phase, and removes the moisture from the solid phase in the same process.

The HTC process has its own particular benefits for production operations. Biomass products processed in this manner generally include and begin with more wet (moisture laden) biomass fibers such as grasses and agricultural by-products, straws, wet agribusiness by-products and the like. The end product of the solid phase is also a friable, hydrophobic cellulose and lignin product that has the same ultimate grinding ability, hydrophobicity, and workability as the above described torrefied product and can be used much as the torrefied product described above, once liquid has been removed in one process or another such as an evaporative process or a centrifugal process.

A newer type of conversion process, known as CELF, or Co-Solvent Enhanced Lignocellulosic Fractionization, may also be used to process biomass types that, for example, consist primarily of smaller particles of woody based biomass, including such biomass as sawdust or shavings or agribusiness by-products such as hulls and seeds, shells, food or feed, processed waste such as cotton gin trash, grape pomace, crushed pits, feed mash or already ground smaller biomass fibers. This process is particularly useful where the output of the components from the biomass feedstock result in solutions which can be further processed and used for different purposes in different fuels, such as, for example, extracting alcohols and lighter oils, gasses, or solutions to be processed into gasoline or kerosene, or separation from heavier fuels such as biodiesel and ship's bunker fuels.

The CELF method processes the raw biomass furnish under lower heat and pressure than the previous processes resulting in a liquid component, which may include the solvents used to fractionate the components, water and a dissolved lignin component which can then be separated, and a solid cellulose component, which may be particulate in form, that can be extracted and used individually or together as building blocks for other fuels. Lignin and cellulose may then be processed into biofuel and cellulosic particles that will then be used or further processed to create submicron and nano particles by the same means of pulverizing and deriving powders as used with HTC or torrefication but, because of the chemical fractionization rate, it may be accomplished at a more rapid rate and at a lower temperature and shorter time to create a more diversely tailored output product.

A fourth process that may be used to create micron, submicron and minute nano-particles of biocarbon or biochar by specialized heat treatment is to use an abbreviated pyrolysis process where the biomass is processed in a much higher temperature environment, often at temperatures in excess of 500 degrees Centigrade, albeit for a shorter period of time, than in the previous processes and whereby the inherent VOC's and hemicellulose are removed rapidly in the beginning of the process and the resultant remaining cellulose and lignin product is carbonized or charred but not completely pyrolized. In this form of heat treatment process, however, the off-gassed water vapor is removed and certain pyrolysis type oils, lower heavy oil, and tar compounds which are usually the last to be consumed and are turned to a gas vapor which is condensed or distilled in a conventional pyrolysis process, instead remain in the residual lignin and cellulose biochar and are not removed from the cellular content of the carbon laden solid biocarbon.

The residual heavy oil and tar compounds that remain in the carbonized biochar particles after the abbreviated pyrolysis process increase the energy content of the char particles. This type of abbreviated pyrolysis process may be considered an advantageous method because the residual biochar itself has much of the energy that would otherwise have been already cooked out of it by the ordinary pyrolysis process and distilled into another product or turned into ash. In any event, the remaining biocarbon or biochar product, including the pyrolysis oil and tars, must be further processed to produce both a final torrefied biocarbon or biochar having hydrophobic and friable qualities and higher energy density.

All of the above processes provide a relatively dry (generally under 5% and more normally a 3% moisture content or less), particulate fuel that can be burned or gasified under the right conditions and in the right equipment to provide green, non-polluting heat and energy with a carbon neutral footprint and a substantially reduced emission curve as compared to conventional biomass or non-renewable fuels. However, the biochar product of the heat treatment processes described above is, without further processing and cautious handling, difficult to commercially bulk transport and store, dangerous to stockpile or deliver as a powder without causing a risk of airborne dust contamination or simply dangerous concentrations becoming an easily ignitable or even explosive mist, and difficult if not impossible to control and feed in a measured and controlled way into a variety of commonly used heat and energy generating equipment. It is also undesirable in a floating loose dust form with ordinary bulk non-processed biomass fuels used in dedicated biomass heat or energy generation equipment.

Moreover, one approach to controlling the dust and storage problems of the torrefied product in a cost effective manner has been to pelletize or cube the torrefied biochar. However, pelletizing and cubing the biochar limits its use to equipment and feed streams that are designed only for such dry feedstock handling use.

Conventional liquid fuels today made from biomass are distilled, chemically cracked, fractionated, and refined through a number of highly complicated, expensive and critically engineered processes that destroy or remove the solid component from the fuel, extract sugars and/or other compounds, and in the end create a bio-oil or bio-gasoline or alcohol based fuel. No matter how these liquid biomass derived fuels are made, they are not solutions, liquid dispersions, or colloids because they have no particulate content in the final product. The process of creating a bio-gas, bio-oil, ethanol or methanol from raw biomass results in a by-product waste, sludge, or agglomerated lignin and cellulosic sugar depleted fiber and ash product. These waste by-products generally have been accorded little residual value, because their subsequent use relies on further processing the waste by-product to de-wet and dry the waste product before it can be burned or used as a soil amendment or component of animal feed without fostering undesirable bacteria or chemical compounds. Consequently, the conversion of these waste by-products has been complicated, problematic, and generally not cost effective.

What has been needed, and heretofore unavailable, is a practical, commercially viable and functional, low-cost process for producing and using a natural biomass based carbon feedstock derived from many sources as a biocarbon or biochar based feedstock as a fuel to be used in a variety of commonly diverse heating and energy generation capacities, without requiring specifically dedicated, special purposed and designed and engineered biomass heating and electrical generating equipment. Such a carbonized based feedstock should be able to be manufactured from a variety of different biomass furnishes, including various plant matter, including trees, bushes, agribusiness by-products, crops and grasses and other sources of raw biomass, for example, the waste product or sludge created by liquid biofuel manufacture, various types of shells, such as, for example, coconut, pistachio, walnut, almond, and the like. It should also be able to be used from recycled scrap fiber or industrial cellulosic waste products including ground industrial waste wood, construction fiber, railroad ties, and paper and pulp waste. Such a biocarbon or biochar may be used in a number of diverse applications to create a fuel that can be used for the production of heat or energy. In some cases the biocarbon may be incorporated into a non-aqueous fluid that can be burned to produce heat or energy. The biocarbon may also be processed in such a manner that the liquid component of the raw biomass is separated and further processed to remove valuable minerals contained in the liquid component. Carbonized biomass based fuels should be able to be mixed with existing petroleum based fuels or refined biomass sourced oil based liquid fuels resulting in overall lower cost, lower emission fuels while maintaining or improving the energy content of the resultant fuel. The biocarbon may also be processed by adding a suitable oil to the biocarbon produced by torrefaction and then polymerizing the oil to bind the biocarbon in a desired form or shape, such as an anode, granule, crumb, small cube or ball, briquette, mini-tubes, micro-tubes, pellets or other shapes. The present invention satisfies these, and other needs.

SUMMARY OF THE INVENTION

In its most general aspect, the invention includes a method for compounding a non-aqueous biofuel derived from various solid but specially processed biomass furnishes into a liquid fuel that may be used in engines such as diesel engines and other internal combustion engines, combustion turbines or aero-derivative turbines, conventional boilers as well used in non-internal combustion devices where the fuel is burned to provide indirect generation of heat or energy, including diesel, gas or steam driven turbines.

In another general aspect, the specially processed biomass furnish is a carbonized biochar that may be manufactured using various processes. In one aspect, the biocarbon is created using a torrefaction process that processes raw biomass into a brittle, friable, hydrophobic, energy dense, low moisture content material.

In another aspect, the biocarbon is created using a process that results in a brittle, friable low moisture content component and a separate liquid component. In one aspect, the separate liquid component may be processed to extract chemicals and minerals present in the liquid component. The extracted chemicals and minerals may be further purified or processed.

In still another aspect, the feedstock for the special process used to create the biocarbon may include not only raw biomass, but also the waste product from processes that create liquid biofuels such as bio-gasoline, bio-oil, or various other energy containing liquid fuels, such as, for example, ethanol and methanol.

In another aspect, the biofuel is a colloidal dispersion of micronized and nano-particulated biocarbon in a petroleum or oil-biofuel base. Such a dispersion is advantageous in that it provides for supplementation of a petroleum based fuel in such a manner as to maintain or increase the energy content of the fuel while reducing the amount of petroleum product consumed while reducing the harmful environmental impact of use of the petroleum based fuel.

In still another aspect, the biofuel is added to heavy fuel oil such as, for example, bunker fuel oil to dilute or blend with the fuel oil, reducing both the percentage of harmful sulfur or other mineral components of the bunker fuel and reducing the overall price of the blended or diluted fuel while maintaining or increasing the energy content, lubricity, cetane value and other characteristics of the heavy fuel oil without increasing the amount of harmful emissions resulting from the combustion of the blended mix of biofuel and bunker fuel oil.

In another aspect, the invention includes a method of making a green biofuel based on renewable biomass feedstock, comprising: receiving biomass feedstock; processing the biomass feedstock to produce a low moisture biocarbon; particulating the low moisture biocarbon; and forming a colloidal fluid from the particulated low moisture biocarbon and a non-aqueous combustible liquid.

In another aspect, processing the biomass furnish to produce a low moisture biocarbon includes torrefaction of the biomass feedstock. In an alternative aspect, forming a colloidal fluid includes dispersing the particulated low moisture biocarbon in the non-aqueous combustible liquid. In one alternative aspect, the non-aqueous combustible liquid is bio-oil. In another alternative aspect, the non-aqueous combustible liquid is a petroleum based liquid. In still another alternative aspect, the petroleum based liquid is diesel fuel. In yet another alternative aspect, the petroleum based liquid is oil. In still another alternative aspect, the petroleum based liquid is #6 Residual Fuel Oil or Bunker C fuel oil.

In still another aspect, particulating the low moisture biocarbon produces a low moisture biocarbon having a particle distribution in the range of 10 micron to 100 nanometers. In one alternative aspect, the particle distribution has an average particle size of 200 nanometers to 400 nanometers.

In yet another aspect, the low moisture biocarbon is hydrophobic. In still another aspect, the low moisture biocarbon is friable.

In another aspect, the biomass feedstock includes waste from a process that produces a combustible liquid from raw biomass. In still another aspect, processing the biomass feedstock produces a low moisture biocarbon and a liquid component.

In a further aspect, the invention includes a method further comprising extracting a selected material from the liquid component. In one alternative aspect, the selected material is selected from the group consisting of chemicals, salts and minerals. In another alternative aspect, the selected material is lithium.

In still another aspect, the invention includes a method of producing a green biofuel based on renewable biomass feedstock, comprising: receiving a renewable biomass feedstock; processing the renewable biomass feedstock to produce a friable hydrophobic biocarbon; particulating the friable hydrophobic biocarbon into submicron size particles; and forming a colloidal fluid by combining the submicron size particles with a combustible liquid. In an alternative aspect, the combustible liquid is a bio-oil. In another alternative aspect, the combustible liquid is a petroleum based liquid. In still another alternative aspect, the combustible liquid is a blend of bio-oil and a petroleum based liquid. In still another alternative aspect, the combustible liquid is a petroleum based liquid blended with bunker oil. In another alternative aspect, the combustible liquid is #6 Residual Fuel Oil or Bunker C fuel oil.

In yet another aspect, the invention includes a method of producing a biofuel from a biomass feedstock, comprising: receiving a biomass feedstock; processing the biomass feedstock to produce a low moisture biocarbon; particulating the low moisture biocarbon; and combining the particulated low moisture biocarbon with a combustible liquid. In one alternative aspect, combining the particulated low moisture biocarbon with a combustible liquid forms a colloidal dispersion of the particulated low moisture biocarbon in the combustible liquid. In still another alternative aspect, the combustible liquid is #6 Residual Fuel Oil, Carbon Black Oil or Bunker C fuel oil.

In yet another aspect, processing the biomass feedstock includes heating the biomass feedstock to form a solid energy dense friable biocarbon with no VOC's and no remaining hemicellulose to pollute or smoke when combusted and a liquid and a condensable gas from which bio-oil can be distilled. In still another alternative aspect, the liquid is processed to extract a selected chemical from the liquid for fuel or polymerization. In another alternative aspect, the liquid is processed to extract a selected mineral or chemical compound from the liquid. In yet another alternative aspect, the liquid is processed to extract a selected salt from the liquid.

In another aspect, the invention includes a green liquid fuel; comprising a particulated solid biomass derived fuel dispersed into a non-aqueous liquid to form a combustible colloidal suspension. In an alternative aspect, the solid biomass derived fuel has an average particle size of less than or equal to 10 microns. In another alternative aspect, the solid biomass derived fuel has an average particle size in the range of one micron to 100 nanometers. In another alternative aspect, the non-aqueous liquid is petroleum based. In yet another alternative aspect, the petroleum based non-aqueous liquid is fuel oil. In still another alternative aspect, the non-aqueous liquid is a liquid biofuel. In another alternative aspect the micronized solid biomass derived fuel is misted and blended with powdered pulverized coal to be used in a co-fired combustion process.

In another general aspect, the invention includes a system and method to continuously carbonize/torrefy biomass into a bio fuel. In one alternative aspect, the continuous carbonization/torrefaction process utilizes a reactor to carbonize/torrefy a blend of uncarbonized biomass mixed with a non-aqueous bio fuel, the bio fuel acting as a heat transfer fluid, The heat transfer fluid surrounds the biomass, lubricating the biomass blend as it is pumped through the continuous reactor, and also improving and supplementing the process of heat transfer from the walls of the reactor to the biomass. In another aspect, the reactor is heated by a recycling flow of molten salt. In another aspect, the reactor may be a tube within a tube reactor wherein molten salt is recycled around the interior tube to heat the blend of biomass and heat transfer fluid flowing past at least a portion of the reactor. In another aspect, the invention includes pumping the blend of uncarbonized biomass and carbonized bio fuel heat transfer fluid through a pipe, with at least a portion of the pipe immersed in a tank, bath or vat containing a recirculating molten salt system.

In still another aspect, the output of the continuous carbonization/torrefaction reactor may be piped into a pyrolysis reactor for producing pyrolysis oil, pyro-gas and other by-products. In one alternative aspect, the pyrolysis reactor may be a 'tube-in-tube' reactor heated to a temperature sufficient to induce pyrolysis of the carbonized/torrefied biomass blend flowing at a controlled rate, time and temperature through the pyrolysis reactor. In another alternative aspect, the heat supplied to the pyrolysis reactor may be provided by a recirculating molten salt system.

In another general aspect, the invention includes a system and process for carbonizing/torrefying a blend of uncarbonized biomass and bio fuel in a batch method. In this aspect, uncarbonized biomass of varying size, dimension or biomass type and composition is loaded in massive lose bulk form into a tank or container where the uncarbonized feedstock remains in place, the tank is closed and an airless environment is created, bio fuel is added by pumping into the container, while the tank remains closed. The tank is then heated from the outside by a heat exchanger using a recirculating molten salts fluid and at the same time in the inside biomass mix by recirculation of the biofuel heated and pumped into the tank until the biomass loaded into the tank or container is carbonized/torrefied. In an alternate aspect, the bio fuel may act as a heat transfer fluid and be recycled through the reactor tank and heated to provide the heat energy for the carbonization/torrefaction process or pyrolysis. In another aspect, the tank or container may be submerged in a vat or tank of molten salt to provide heat for the carbonization/torrefaction process.

In still another aspect, the invention includes a system for carbonizing a biomass, comprising: a pump adapted to receive a blended feedstock of non-carbonized biomass and bio fuel, the bio fuel both providing a heat transfer medium for the biomass and a means of lubricating the bio mass so that it will flow within and through the reactor by being pumped and pushed by the subsequent additional biomass and biofuel blend being processed; and a reactor configured to continuously receive the blended feedstock and to carbonize the uncarbonized biomass of the blended feedstock, the bio fuel of the blended feedstock also providing for a managed and regulated and controlled enhanced transfer of heat to the uncarbonized biomass. In an alternative aspect, heat is provided to the reactor using a recycling molten salt stream, the molten salt having a first temperature level in excess of 350 C and raising upwards to 500 C or greater as desired.

In yet another aspect, the reactor outputs a continuous stream of a second blend containing carbonized biomass and bio fuel; and further comprising a pyrolysis reactor configured to continuously receive the second blend and transform the carbonized biomass into a pyrolyzed product. In an alternative aspect, heat is provide to the pyrolysis reactor using a second recycling molten salt stream, the molten stream having a second temperature range exceeding 350 C and raising upwards to in excess of 500 C or greater as desired.

In yet another aspect, the invention includes a system for carbonizing biomass, comprising: a sealable container configured to receive a blend of uncarbonized biomass and an already processed colloidal biofuel, the biofuel providing enhanced heat transfer to the biomass being carbonized within the sealed container; a lid for sealing the container; a means of removing air from the container if it is not displaced by the biomass, and a heat source for heating the sealed container. In an alternative aspect the container has an appropriate means of measuring and regulating the flow of product within the container, the temperature of the product and removing the excess steam and VOC gas and cooked hemicellulose which are being off-gassed in the process. In another aspect the container is able to extract and to recycle the off-gas in a separate burner outside the container to continuously heat the container's extracted fluids and to keep the pressure inside the container as close to ambient as possible. In an alternative aspect, the heat source is a recycling flow of molten salt flowing through a heat exchanger or pipe system within the container or outside the container. In another alternative aspect, the heat source is a recycling flow of the bio fuel.

In another aspect, a suitable liquid or oil, such as pyro oil, may be added to the biocarbon produced by the torrefier. The resultant mix may then be further processed, such as by heating the mix in such a way as to polymerize the liquid or oil so that the polymerized liquid or oil binds the biocarbon. In some alternative aspects, the mix is formed into a desired shape, such as granules, crumbs, small cubes or balls, mini-tubes, micro-tubes, pellets, anodes, briquettes or mini-briquettes or other smaller or larger shapes.

In still another aspect, the disclosure includes a method of making a green biofuel based on renewable biomass feedstock, comprising: receiving biomass feedstock; combining the biomass feedstock with a biocarbon colloidal dispersion into a blend; and pumping the blend through a length of first pipe having a first diameter surrounded by second pipe having a second diameter larger than the first diameter, the second pipe being supplied with a continuous flow of heat exchange fluid, the length of the first pipe having an input end for receiving the blend, and an output end for outputting a second blend of torrefied biomass and biocarbon colloidal dispersion generated within the length of the first pipe. In one alternative aspect, the heat exchange fluid is molten salt. In a further aspect, the method includes particulating the second blend to have a particle distribution in the range of 10 micron to 100 nanometers. In one alternative aspect, the particle distribution has an average particle size of 200 nanometers to 400 nanometers. In another aspect, the torrefied biomass is friable. In still another aspect, the biomass feedstock includes waste from a process that produces a combustible liquid from raw biomass. In another aspect, generating the second blend produces a low moisture biocarbon, a condensable gas and a liquid component. In another aspect, the condensable gas is further processed to produce a mixture of suspended solids and non-condensed gas. In still another aspect, the suspended solids are further processed to produce biochar, carbon black, fertilizer, or activated carbon. In yet another aspect, the non-condensed gas is combustible. In another aspect, the liquid component is a pyrolysis liquid. In an aspect, the second blend is inputted into a tertiary reactor. In yet another aspect, the tertiary reactor is heated by a heat exchange fluid, the heat exchange fluid being a molten salt. In still another aspect, the pyrolysis liquid is stored in a storage container. In yet another aspect, the stored pyrolysis liquid is provided as an input to a tertiary reactor for further processing. In yet another aspect, the blend includes coal or non-green material feedstocks.

In another aspect, the disclosure describes a system for carbonizing biomass, comprising: a sealable container configured to receive a blend of uncarbonized biomass and a biofuel, the bio fuel providing enhanced heat transfer to the bio fuel; a lid for sealing the container; and a heat source for heating the sealed container. In one aspect, the heat source may be a recycling flow of molten salt. In another aspect, the heat source may be a recycling flow of the bio fuel. In yet another aspect, the blend includes coal or non-green material feedstocks.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
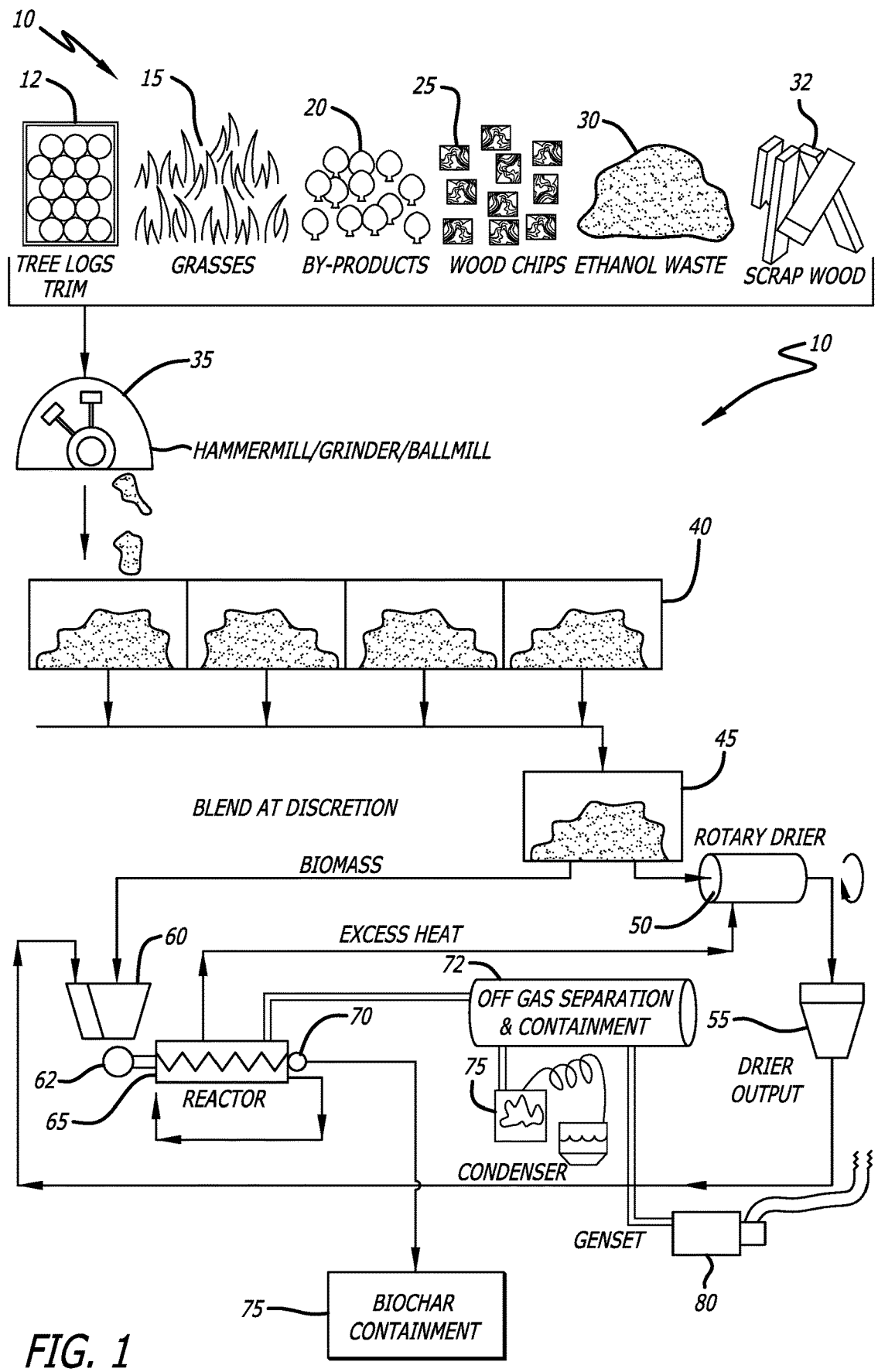
FIG. 1 is a graphical representation illustrating one embodiment of a process used to manufacture a torrefied biocarbon or biochar from raw biomass.

Various embodiments of a process for manufacturing a petroleum or bio-oil based renewable biofuel will now be described. In one general embodiment, the feedstock moves through the reactors and other processes in a continuous process. In one particularly advantage variation of this embodiment, the feedstock comprises raw recyclable matter that is carried by a heat transfer fluid (HTF).

In such a general embodiment, the feedstock being processed is moved through the process by pumping the feedstock within a pipe or channel adapted to transport and process the moving feedstock in an airless, oxygen free environment. It is contemplated that the feedstock is a blend of biomass and one or more separate heat transfer fluids. The heat transfer fluids act as a lubricant and heating component, and typically have a viscosity sufficient to move the biomass and heat transfer fluid through the process.

In this general continuous embodiment, the pipe or channel is directed through a heat tank or surrounded by coils through which another heat transfer fluid, such as, for example, molten salt, is recirculated. The time and temperature and duration of the movement of the mix of uncarbonized feedstock and carbonized heat transfer fluid in the pipe and heat of the molten salts bath are controlled to suit the process. Excess steam and pressure build up during the process may be removed from the pipe or channel using vacuum pumps. In some embodiments, off-gas extracted from the process stream may be used as fuel to perpetuate the heating function to heat the biomass-carbonized heat transfer fluid mix, the molten salt, or anywhere else in the process stream where use of the heat generated using the off-gas may be desired. A heat exchanger circulating the fluid may be remote or integrated and the flow and temperature of heat transfer fluids and molten salts may be managed according to results desired.

In this general embodiment, the use of moving parts (excepting pumps) is completely minimized so the flow can be regulated and increased to move large volumes of cellulosic biomass continuously through the process. At the end of the carbonization/torrefaction process, the carbonized product is extracted from the end of the pipe or channel and may then be either used as, or directed through further processes, such as a pyrolysis process to create a liquid or gaseous pyrolysis oil, biochar, and/or gas.

The essence of this embodiment is a continuous means to torrefy and gasify cellulosic biomass in large volumes and control the quality, volume and output through the use of one heat transfer fluid blended with unprocessed biomass, and the use of another heat transfer fluid, such as molten salt, to provide heat to the above described feedstock blend.

One advantage of this general embodiment is that the use of the carbonized heat transfer fluid as a transport media provides not only an efficient heat and transport media which can be used without the need to extract a material, such as, for example, an aqueous transport media to move the unprocessed biomass through the carbonization process, but it improves the conveyance of heat energy into the biomass from the molten salt heat energy transfer fluid into the biomass. This allows the rate of continuous carbonization of the biomass to be more precisely controlled, and improves the overall efficiency of the process by avoiding the need to extract the carbonized biomass from the transport media.

In a second general embodiment, biomass is converted into carbonized biomass in a batch mode by heating the biomass within a closed tank or other container until a desired level of carbonization is reached. In contrast to the first general embodiment described above, the biomass does not move, and is processed in place.

In this second general embodiment, large chips or pieces of bark and tree limbs or even logs are placed into a containment tank or vessel. The volume of the containment tank or vessel may have a volume that is as large as a sea container or rail gondola car. Even larger containment tanks or vessels may be used, such as, for example, a ship's hold, or a portion of a ship's hold.

The containment tank or vessel is filled with biomass which can be of varying size and dimension and even have difficult to remove unwanted pieces of metal, rock, stone that could not otherwise be practically removed or ground up beforehand and a lid is attached to seal the tank or vessel. The containment tank or vessel will typically have multiple openings formed in a wall, lid, or bottom of the tank or vessel to allow for the introduction of a heat transfer fluid such as a viscous carbonized heat transfer fluid that may initially be at ambient temperature, or it may be heated to an elevated but non-combustible temperature. One such heat transfer fluid that may be used is GRC88™ green renewable fluid distributed by Permanente Corporation.

In one alternative embodiment, the biomass to be carbonized is immersed in the heat transfer fluid. The heat transfer fluid is heated and pumped through the biomass in the tank and then extracted from the tank and recirculated so that the heated fluid encapsulates and surrounds and moves through the biomass and torrefies or carbonizes it over a period of time. The lid and the tank or vessel may have valves and pipes to enable the metering and measuring of the inflow and recirculation of the heat transfer fluid through the tank or vessel.

In one alternative embodiment, air may be removed from the sealed tank or vessel using, for example, a vacuum pump. Pumps may also be used provide for the extraction of off-gas and steam vapor from the tank or vessel as the carbonization process proceeds. As described above, the off-gas may be used for reheating the heat transfer fluid either through direct heat exchange or by burning the off-gas to provide for indirect heating of the heat transfer fluid.

In yet another alternative of the second general embodiment, when the desired torrefaction or carbonization process has begun, additional heating of the tank or vessel may be provided raise the temperature of the tank or vessel and its contents. Such additional heating may be provided by, for example, heat exchange between piping or channels on one or more sides, lid, or bottom of the tank or vessel. These pipes or channels allow for a heat exchange fluid, such as, for example, molten salt, to be pumped around the exterior of the tank or vessel, heating the tank or vessel. This heat is then conducted into the interior of the tank or vessel through the walls, lid, and/or bottom of the tank or vessel to further add heat energy to the contents of the tank or vessel.

In some embodiments, the piping or channels described above may be configured similarly to a radiator. The sides of the radiator are typically heavily insulated with an insulator, such as, for example, rock wool, such that the heat produced through the molten salts flowing through the pipes radiates through the walls of and into the containment tank or vessel. The temperature of the molten salt may be controlled and monitored while circulating through the radiator and kept within a range of operating temperature. In some embodiments, different molten salts having different temperature ranges and freeze points can be used in separate heat transfer tubes or heat exchangers to provide a more diversely managed range of heat treatment of the biomass being carbonized.

When a desired temperature is reached within the tank or vessel, or when the process is completed in either the continuous or batch embodiments described above, the circulation of the molten salt heat transport fluid is stopped. The molten salt may then be removed from piping or channels through which it has been circulated, and pumped into an insulated containment vessel for later use. It is a known fact that well contained and insulated molten salts will hold heat sufficiently that they will lose only a degree or two over a month's time. Such reuse is advantage in that it provides for decreased cost of processing the uncarbonized biomass.

It will be appreciated that the molten salt may be stored in different insulated containers, allowing molten salt of different temperature to be used. For example molten salt having a temperature suitable for torrefaction may be used in the torrefaction process to carbonize the biomass, while molten salt having a temperature suitable for pyrolysis may be used to pyrolyze the torrefied biomass. In on embodiment, a pipe as in the first general embodiment is exposed to a radiator in which is circulated molten salt having a temperature suitable for torrefaction at a first portion of the pipe to continuously torrefy the biomass blend being pumped through the pipe. After the blended biomass has been pumped through a sufficient length of the pipe to torrefy the biomass, the blend containing the now torrefied biomass may encounter a second portion of the pipe being heated by a second radiator through which a molten salt having a temperature suitable for pyrolysis is being circulated.

Similarly, such a dual radiator system may used to head the tank or vessel of the second general embodiment. Additionally, it should be understood that in such an embodiment, two separate radiators may not be necessary, provided appropriate valves and piping are provided to allow the input of a single radiator to be supplied with two or more molten salt sources, each of the sources providing molten salt at a desired temperature.

FIG. 1 illustrates one embodiment of a process 10 for treating raw biomass to manufacture a low moisture torrefied biocarbon or biochar. In this embodiment, biomass of various types 12, 15, 20 , 25, 30 and 32 are accepted for processing to materially and substantially alter the form of the biomass from a high moisture laden or moisture compatible, hydrophilic, bulky and difficult to handle solid into an extremely low moisture content, hydrophobic, non-moisture compatible, friable solid of a more dense energy content than the original biomass furnish and into a product that may be further processed.

The feed stock for the process may be almost any plant or plant derived material, such as, for example, trees, tree parts, logs, or log trim 12, grasses 15, agricultural by-products 20, wood chips, 25, waste from the production of ethanol 30, and scrap wood 32. Examples of by-product from wood use operations include, but are not limited to, sawmill residue, chips, sawdust and shavings, hog fuel including bark, and logging slash. Examples of agricultural waste include, for example, but not limited to, nut shells or husks, pits, ground wood fiber, pomace, hulls, straw, cotton gin trash, vine or tree pruning or even woody based fiber and bark, limbs, trunks and branches from removed orchard trees, nursery or yard tree branches and trunks, remaining after one or more trees have been cut down, semi-processed and residual agribusiness by-products, and the like. Such furnish biomass is bulky, difficult to stockpile, expensive to transport, full of moisture or foreign matter including refuse, dirt, sand, metal, plastics, ash contaminants and other unacceptable particulate matter, and costly to process and typically has a very low heating value per unit of as-is weight. The aggregation of the feedstock may include chipping, grinding, crushing, and occasionally, washing and cleaning to remove field debris, and then windrow piling the feedstock. The biomass may also be compacted by its own weight in vans and open topped trailers used to transport the biomass to a secondary use or disposal site, or the biomass may be piled in windrows. At this stage of the aggregation, however, the biomass is not pelletized or cubed, is generally laden with moisture, and subject to energy loss through decomposition if the biomass is not properly air dried when being stockpiled.

In another embodiment, the waste sludge, lignin and cellulose content remaining from the production of ethanol, bio-oils, or distillation of biomass may also be used as a feedstock. This waste product may be used as a solitary feedstock, or it may be combined with the raw feedstocks described above.

The various types of biomass 12, 15, 20, 25, 30, and 32 typically undergo a process 35 to reduce the size of the biomass to a desired particle size for efficient processing. Process 35 may involve, for example, running the raw biomass through a hammer mill, a ball mill, a grinder, or some other mechanical process that cuts, shreds or otherwise reduces the size of the individual pieces of biomass to a desired size. The processed biomass may also be screened and/or washed to remove foreign matter.

In the embodiment of FIG. 1, the processed feedstock is stored in appropriate storage bins, stockpiles, containers or silos 40. In some embodiments, each type of raw biomass is stored separately from another type, although in some instances this separate storage is not necessary. As shown in FIG. 1, the various types of biomass may also be blended using a blender 45 to provide a raw biomass feedstock having desired characteristics and/or properties.

Depending on the type of raw biomass available, the raw biomass may be processed through a dryer, such as a rotary drier 50, although other types of driers may be used. Once the raw biomass is dried to a desired moisture level, the dried biomass may be transferred to a holding hopper 55, or may be transferred to a feed hopper 60.

Alternatively, when the moisture content of the raw biomass is suitable for further processing, or if the process can accommodate a high moisture level, the raw biomass may be directly transferred to feed hopper 60. At this point in the process, the raw biomass is processed into a char, various embodiments of which will be discussed in more detail below.

In the embodiment shown in FIG. 1, the raw biomass held in hopper 60 is fed through an airlock 62 into reactor 65. In this embodiment, the airlock 62 is used to prevent air from entering reactor 65 and the reactor is used to torrefy the raw biomass in the absence of oxygen to create a hydrophobic and friable biochar. During torrefaction, the biomass is substantially changed in its appearance, chemistry, workability, and suitability as a fuel, resulting in a specially heat-treated intermediate biocarbon or biochar product that is completely homogeneous in appearance regardless of the feedstock or feedstocks used to create the biochar, and if, or when, blended with other biochar products similarly processed results in an end product that is similar in content and performance characteristics from any other biomass feedstock variety in the mix of original biomass furnish used.

Torrefaction is a pyrolytic thermochemical treatment of biomass at temperatures that typically range from 280 to 350° C. and for varying periods of time in the absence of oxygen. The thermochemical treatment is generally carried out in reactor 65 under atmospheric, or slightly above atmospheric pressure in the absence of oxygen. During the torrefaction process, the water contained in the biomass is vaporized and released from the biomass, and the biopolymers (cellulose, hemicellulose and lignin, among others) present in the biomass partly decompose or deconstruct, and bonds are broken apart, giving off various types of volatiles and consuming hemicellulose in the process. When the process is complete, the remaining solid, dry, blackened material is commonly referred to as a "torrefied biocarbon" or "torrefied biochar."

The torrefied biochar resulting from the original biomass typically loses 20% to 25% of its mass and usually not more than 10% of its pre-processed weight to caloric heating value, densifying the energy content in the remaining resultant product and increasing the overall caloric value with reduced weight measure with no appreciable increase in volume. The volatiles given off during the torrefaction process may be collected and used as a heating fuel for the process. Typically, hemicellulose is consumed early in the process which beneficially removes the future combustion source of smoke, much particulate matter and lesser energy containing materials.

After the biomass is torrefied it can be compressed, crushed, pulverized, powdered and densified. In many cases, the char is formed into briquettes or processed into pellets using conventional densification equipment. Torrefied biochar is relatively hydrophobic, and will not wick up but instead repels water and thus can be stored outside where it may be exposed to moist air or rain without appreciable change in moisture content or heating value, unlike the original biomass from which it is made. Moreover, torrefied biomass biochar will not rot, compost, decompose or otherwise degrade in stockpile over time.

After the torrefaction process is completed, the torrefied biochar is removed from reactor 65 through airlock 70, and transferred to a biochar containment area 75, bin or vessel for storage of the biochar before further processing. Waste heat from the torrefaction process may be extracted from the reactor 65 and conveyed to dryer 50, when a dryer is used to decrease the moisture content of the raw biomass. This process is advantageous in that not only does it reduce the costs associated with drying the raw biomass, but it also renders the process more "green" in that less fuel needs to be consumed simply to dry the biomass. The off-gas heat and the VOC's that result from torrefaction may provide a fuel and heat combination that may be burned at higher temperatures for use in the rotary drier 50. Use of the off-gas heat and VOC's in this manner tend to render the heat source substantially less polluting.

In some embodiments, the biochar may be densified by pelletizing or cubing the biochar after it is extracted from the reactor and cooled. At this stage, the biochar is extremely friable and its dust tends to float in the air, which may make the torrefied biocarbon or biochar dangerous to store in loose bulky, dusty, powdered form.

In another embodiment, gas resulting from the torrefaction process may be pulled off or vented from the reactor and sent to gas separator 72. The flammable fractions separated out may be extracted, condensed into a liquid or solid form, and be either stored for future use, or sent to another process for use either as a solvent, transportation medium, or energy source. In another alternative embodiment, the separated gas may be used to power various equipment in a plant, such as, for example, a generator or genset 80.

Figure 4:
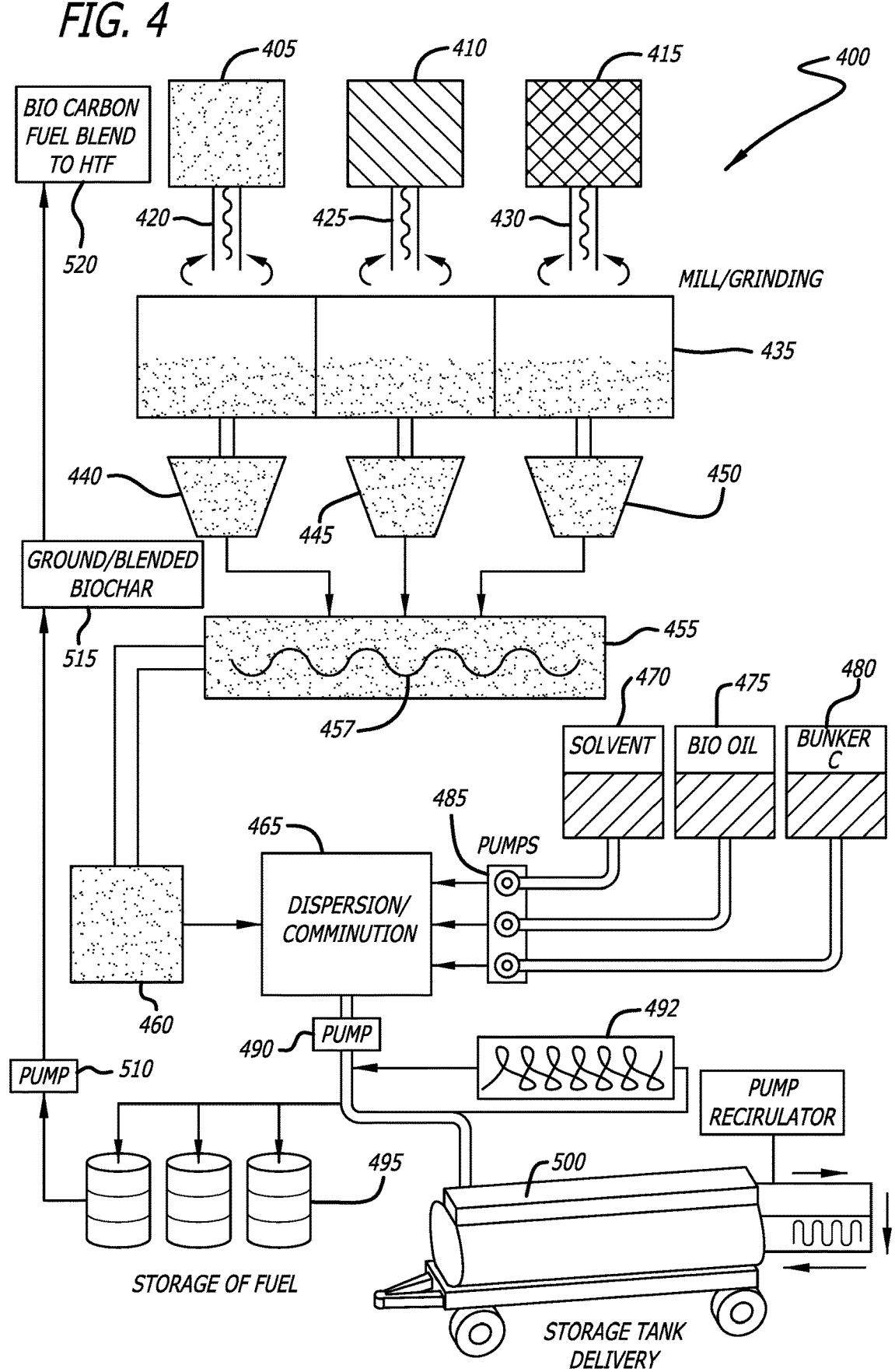
FIG. 4 is a graphical representation illustrating one embodiment of a process for manufacturing a liquid biofuel using the torrefied biocarbon or biochar manufactured using the embodiments of FIGS. 1-3.

FIG. 4 illustrates an embodiment wherein the biochar, instead of densification, pelletization or cubing, is ground or otherwise pulverized and processed to produce a fine dispersible low moisture content powdery material. The pulverization process may be controlled to produce the fine material in a variety of particle sizes and particle size distributions. The fine dispersible material may be combined through a comminution process with a non-aqueous solvent or fluid to provide a liquid biofuel.

The liquid biofuel may take several forms. For example, the particulated biomass char may be simply mixed into a slurry using a non-water based solvent. Depending on the viscosity of the fluid and the size of the ground biocarbon or char particles, and the effects of gravity however, the slurry may separate with time, which is disadvantageous. The liquid biofuel and biochar may be kept in a solution by continually recirculating the fluid and particle blend through a static mixer device.

In one embodiment, the liquid biofuel is created by forming a colloidal dispersion of the pulverized torrefied biomass or biochar and the solvent. In this process, the particle size of the biochar is made small enough so that once the particulated biochar is dispersed into the solvent with or without a surfactant, a colloidal dispersion is formed. One of the principle characteristics of such a colloidal dispersion is that the dispersed particles do not settle out of solution and remain uniformly blended therein throughout the lifetime of the colloidal solution.

It has been determined that biochar particles having a particle size in the range of 1.0 micron to about 100-150 nanometers with a mode of 200 to 300 nanometers can be sufficiently dispersed into a non-aqueous viscous medium such as bio-oil fuel or fuel oil or a mix of the two so as to form a colloidal dispersion. It will be understood, however, that different ranges are possible depending on the desired properties, such as blending medium, viscosity of the blending fluid and heat content, among other characteristics, of the final dispersion. For example, the particulated biochar may have differing particle size distributions, such as ten weight percent being particles of 10 microns or less, with other reduced fractions being distributed so that the overall particle size distribution allows forming a colloidal dispersion. The process may also use surfactants to prevent a charged biocarbon particle from attracting to and agglomerating to other particles within the fluid blend over time.

It will be understood that the amount of biochar dispersed into the non-aqueous solvent will affect the viscosity and heat content by volume of the resultant colloidal dispersion. Thus, the liquid biofuel may be formulated, designed, and manufactured having characteristics that are most desirable for use in particular applications.

As shown in FIG. 4, various types of biochar may be stored in storage bins 405, 410 and 415. In the embodiment shown, each type of biochar is processed by pumping or otherwise conveying 420, 425 or 430 the biochar to a mill or grinder 435. Alternatively, a single mill or grinder could be used to process more than one type of biochar without departing from intended scope of the invention.

As the biochar is milled or ground into a fine pulverized material, it may be further screened, processor or classified to remove ash, silica, salts, or other undesirable foreign or minerals as it is transferred to conditioning vessels where the biochar may be treated or processed as necessary, such as, for example, by catalytically treating the biochar with heat and pressure, to provide the energy content/density, moisture content and the like characteristics desired for the resulting biofuel. Optionally, the conditioned pulverized biochar may be stored in the conditioning vessels, hoppers or bins 440, 445, 450. Since the pulverized biochar has a very fine particle size, it may be advantageous to combine the pulverized biochar with a liquid carrier, such as a solvent or light fuel oil and a surfactant. Mixing the pulverized biochar with the liquid carrier is advantageous in that it mitigates the dust related problems associated with the storage of finely pulverized combustible biochar and prevents agglomeration of single fine particles. This mixing step may be done immediately after the biochar is ground, or it may take place later in the process stream, depending on the design of the solid and fluid content and the safety requirements of the manufacturer.

Referring again to FIG. 4, in embodiments where different types, particle sizes or consistency (or in the case where one or more biochar types have been fluidized by mixing with a liquid carrier), the various biochar feed streams may be combined in a mixer 455. Mixer 455 may achieve mixing of the various feed streams using a mechanical mixer, or alternatively, mixing may be accomplished using a static mixer 457 by pumping the various feed streams through the static mixer.

The output of mixer 455 may be stored in container 460, before being used a feed for dispersion/comminution/blending process 465. Alternatively, the output of mixer 455 may be fed directly into dispersion/comminution/blending process 465.

During the dispersion/comminution/blending process 465, the biochar from the mixer 455 or container 460 is combined with a selected liquid or blend of liquids and if desired surfactants to form a dispersion wherein the particles of biochar are dispersed throughout the liquid in a manner such that the biochar does not fall out of solution or settle due to gravity when the solution is stored. As described above, the particulated biochar from mixer 455 or container 460 is combined with a solvent or fluid 470, and/or bio oil 475, which may be a pyrolysis oil, and/or a viscous fuel oil 480, such as, for example, heavy fuel oil (also called bunker C). Pumps 485 pump the desired fluid or mix into the dispersion process machinery 465 where the fluid is mixed with the pulverized biochar.

Once a liquid dispersion of biochar and selected solvent is created having a set of desired properties, such as, for example, a desired viscosity and/or energy density, the dispersion is pumped using pump 490 either to storage containers 495, or for further disposition, including distribution, to a tank truck 500.

Depending on the type of raw biomass that is available, other processes may also be used to create the solid cellulosic and lignin carbon biochar which is then dispersed into a liquid fuel. As will be discussed, not only may it be advantageous to employ these processes depending on the available raw biomass, but the output of the process may include both liquid and solid phases, each of which may be advantageously used to provide energy used in the process itself, or which may be further processed to provide a biofuel.

In an alternative embodiment shown in FIG. 4, pump 490 may pump the dispersion through a static mixer 492 to ensure that the dispersion is completely formed before it either stored or pumped into a tank truck. In some embodiments, the tank truck may also have a recirculating system to pump the dispersion from the tank and into a static mixer to ensure that the dispersion stays mixed during storage in the tank truck or while being transported.

In yet another embodiment, dispersion may be tapped from either the tank truck or from storage tanks 495, pumped using a pump 510 to a mixer or blender 515, and then blended with ground/blended biochar, resulting in a blend that can be used as a heat transfer fluid 520 for mixing/blending with uncarbonized biomass, such as is described above.

Figure 2:
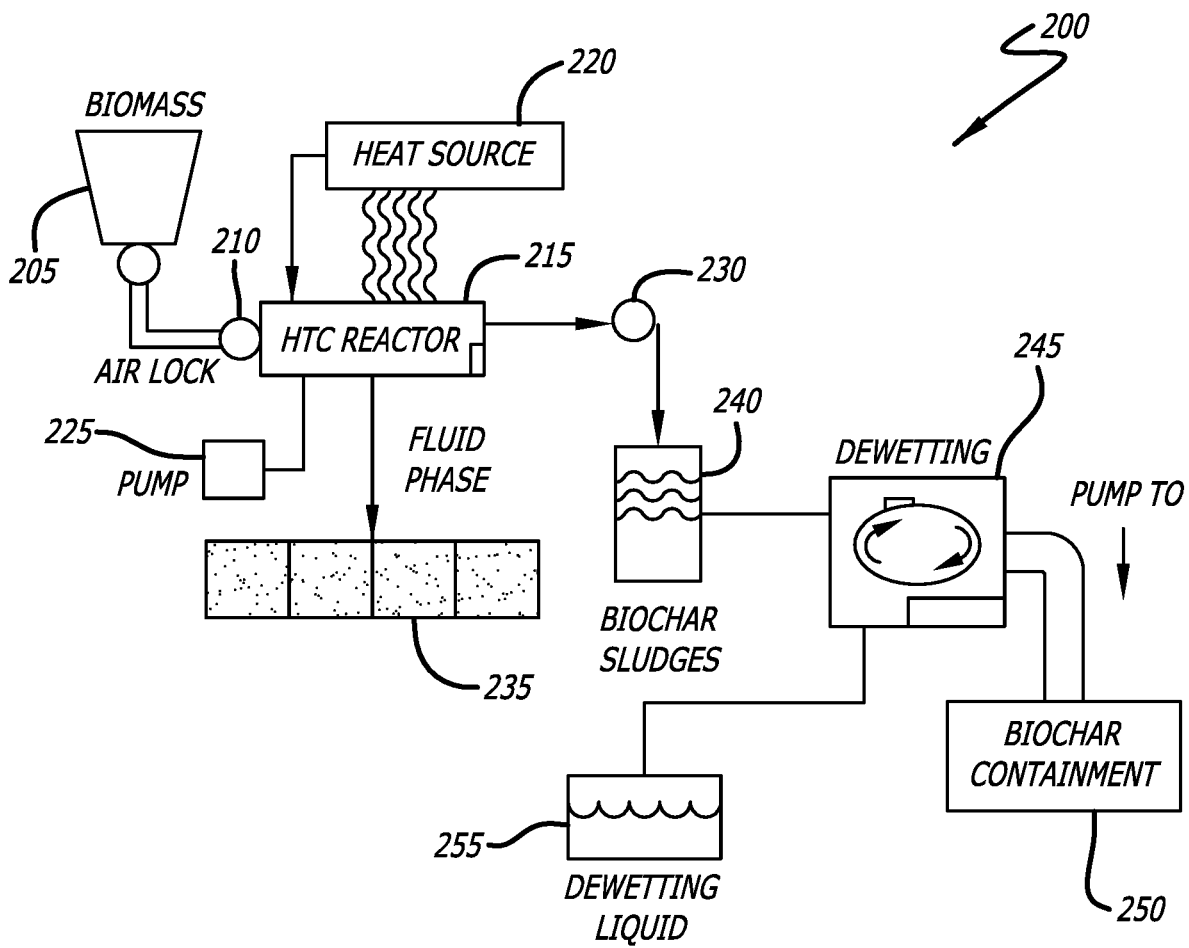
FIG. 2 is a graphical representation illustrating another embodiment of a process used to manufacture torrefied biocarbon or biochar from raw biomass.

In another embodiment, illustrated in FIG. 2, a process 200 is shown where raw biomass 205, which may be screened, ground or chipped, is fed through an airlock 210 into a reactor 215 where the raw biomass 205 is heated in the absence of oxygen and at a lower temperature than torrefaction and pyrolysis and often with a longer exposure to heat, but at increased pressures of up to 700 psi in an autoclave type environment. Heat is provided by a heat source 220, which may be fed by a portion of the off-gassing heat from the process and/or biomass consumed for heat, and the reactor may be pressurized using expanded gases put off by the biomass being consumed inside the reactor process. Additionally, the heat may be supplemented with added pressure of heated gasses retained and re-introduced using a pump 225.

The end product of this process splits the raw biomass into a water vapor laden liquid phase 235 and a bio-carbon laden "sludge" phase 240. The liquid phases and carbon laden phases are extracted from the reactor though suitable means, such as a vacuum pump or an airlock 230.

The liquid phase 235 may contain certain chemicals, salts and other minerals that can be extracted or separated from lignin within the liquid phase using techniques known in the art. These chemicals, salts and other minerals may be further processed and sold, thus providing a secondary income stream from the heat treatment process, while the resultant biocarbon appears as a biochar solid phase and may be used as a biofuel.

The biocarbon laden phase 240 may be further processed using a dewetting device 245. The output of the dewetting device is a liquid 255 and a solid appearing biochar. The solid biochar is transferred to a biochar containment 250 vessel or container as has been discussed previously. Depending on the properties of the liquid 255, that liquid may be further processed to remove water and used as a component of a biofuel, or it may be used to provide energy, such as for example, as a supplement to heat source 220, to the process to increase the efficiency of the process.

In another embodiment, the process of FIG. 2 may be modified using co-solvent enhanced lignocellulosic fractionization to process biomass types that consist primarily of smaller particles of woody based biomass, including such biomass as sawdust or shavings or agribusiness by-products such as hulls and seeds, shells, food or feed, processed waste such as cotton gin trash, pomace, ground pits, feed mash or already ground smaller fibers. This process is particularly useful where the output of the components from the biomass furnish can be used for different purposes in different fuels, such as, for example, extracting alcohols and lighter oils and gasses to be processed into gasoline or kerosene, or with heavier fuels such as biodiesel and ship's bunker fuels or in the extraction of essential oils in the processing of biochemical elements extracted from the cellular structure of the biomass.

In this embodiment, the raw biomass feedstock, which may be cleaned and screened, with impurities removed, is sized reduced as much as practical, is placed in a vessel with certain chemicals, such as, for example, if the end desire is for a light fuel solvent, tetrahydrofuran (THF) and is treated using lower heat and pressure, and for a similar or shorter time, than in the other embodiments described herein, resulting in a liquid component consisting of THF, certain fluids and solvents; water; a dissolved lignin component; and a solid cellulose component that can be used individually or together as building blocks for other fuels. Lignin and cellulose may then be processed separately into biofuels. The solid cellulose particles that result from the process and are filtered or otherwise separated from the liquid component are suitable to be used and combined with other biocarbon feedstock to create micron, submicron, and nano-sized particles powders by the pulverizing and deriving processes described previously.

Figure 3:
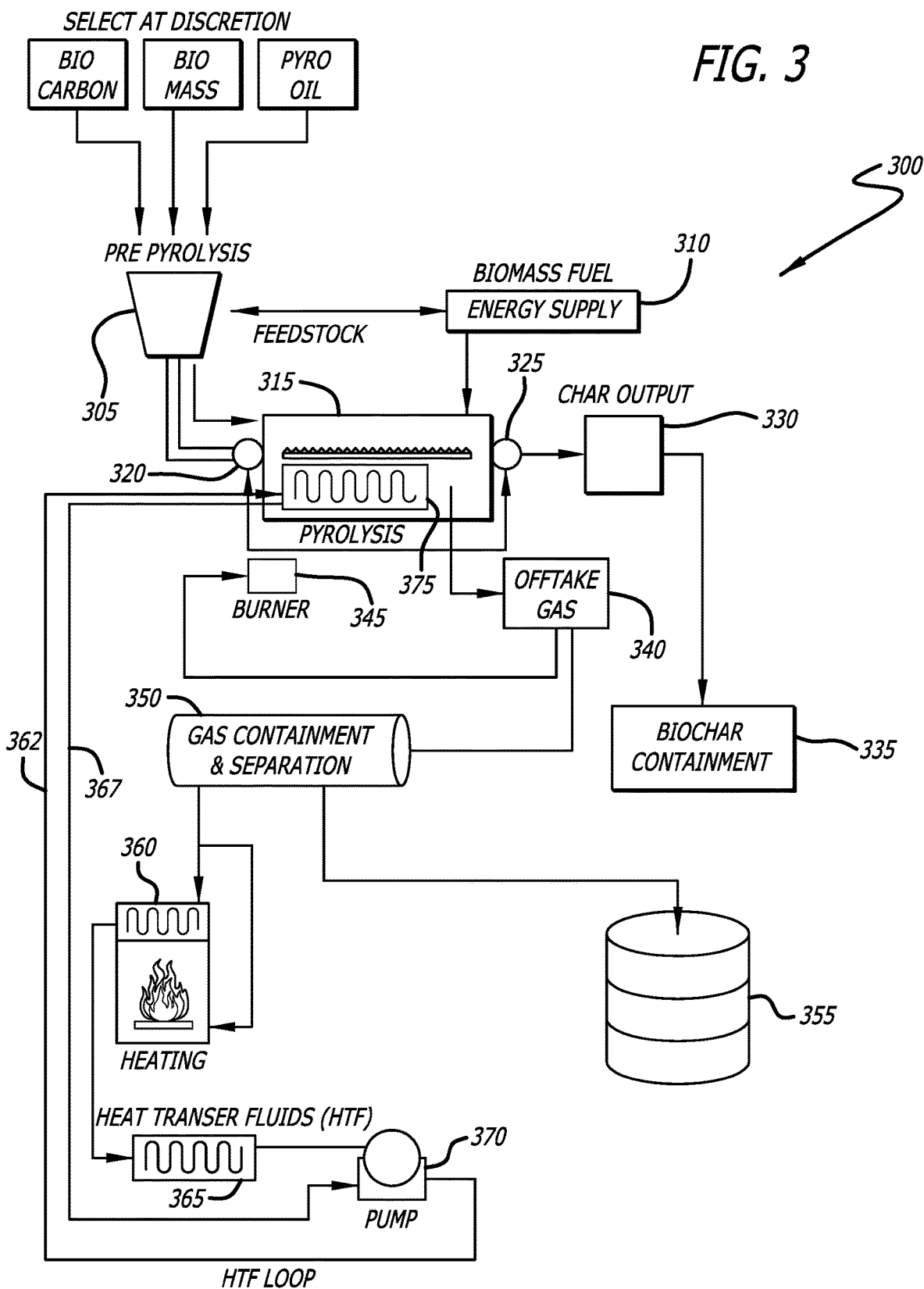
FIG. 3 is a graphical representation illustrating another embodiment of a process used to manufacture torrefied or pyrolyzed biocarbon, biochar and pyro oil from raw biomass.

In another embodiment, illustrated in FIG. 3, a process 300 of creating torrefied biomass or biochar is shown that includes creating micron, submicron and minute nano-particles of biochar by using an oxygen free abbreviated pyrolysis process where the biomass is processed in a much higher temperature environment, often at temperatures in excess of 500 degrees centigrade, albeit for a shorter period of time than needed for full pyrolysis and previously described processes. In this embodiment, inherent VOC's and hemicellulose are removed rapidly in the beginning of the process and the resultant remaining product is carbonized or charred but not completely pyrolized or made into a charcoal. In this form of heat treatment process, however, the pyrolysis oils, lower heavy oil, and tar compounds which are usually the last to be consumed and are turned to a gas vapor and distilled in a conventional pyrolysis process, instead remain in the residual biochar are not removed from the cellular content of the carbon laden biochar.

Raw biomass 310 may be used as a feedstock for the pyrolysis reaction or it may also be used to fuel the pyrolysis reactor 315. As shown, raw biomass, which may be pre-screened and/or washed to remove contaminants such as stone, gravel, sand, salt, metal, plastic or other ash causing substances, and then ground, chipped or pulverized, is fed from supply source 305 into pyrolysis reactor 315. Depending on the process used, air locks 320, 325 may be used to prevent oxygen from entering the reactor when feedstock is added to the reactor for processing, and when biochar is removed from the reactor, respectively. The char output may be further processed at block 330 before being transferred to a biochar containment vessel or container 335. Gases given off during the pyrolysis process may be extracted at box 340, and, in some embodiments, used to fuel or supplement the fuel burned in burner 345 that provides heat to the pyrolysis reactor.

As also shown in FIG. 3, an alternative embodiment provides for the addition of already processed biocarbon, unprocessed biomass, and pyrolysis oil to the biomass fuel 310. In another embodiment, the gas extracted at box 340 may be directed through a separation unit 350. The output of the separation unit can either be stored bio-oil or pyrolysis oil in storage tank 355, or it may be used to heat the carbonized heat transfer fluid within heat loop 362 by being burned in heater 360. A pump 370 is used to recycle heated heat transfer fluid through a radiator in thermal communication with the pyrolysis reactor 315 back to the heater.

The heavy oil and tar compounds remaining in the biochar particles after the abbreviated pyrolysis process shown in FIG. 3 increase the energy content of the char particles. This type of abbreviated pyrolysis process is advantageous because the residual biochar itself has much of the energy that would otherwise have been ultimately cooked out of it by the ordinary pyrolysis process.

Since the specially heat treated biochar from any of the embodiments described above is suitable to be finely ground and pulverized into a powder in micron, submicron and nano sized particles, and since those particles could then be combined with a suitable non-aqueous liquid, such as, for example, a petroleum based liquid, a new fuel comprised of heat treated biomass solids carried in a liquid form is created. As a liquid, the biofuel is easier to handle, transport, store, distribute, and consume than densified versions of the biochar, such as pellets or cubes.

The biochar created by the various embodiments described above is also compatible with petroleum or liquid biomass fuels, in the form of a fluid or as a solid suspended in a liquid, and stored as a liquid, pumped and conveyed as a liquid and delivered up to any variety of conventional liquid fueled heat or energy generating machinery and equipment in a consistent, measured and reliable manner. The biochar, dispersed into a non-water based fluid or as a pseudo liquid which would act, burn, combust and deliver energy similarly to current liquid fuels, becomes a new liquid fuel alternative. It will contain an increased caloric value over the non-water based fluid alone, but will also have substantially less environmental impact resulting from, for example, reduced sulfur, mineral, heavy metal and ash contents. The added solid carbon sourced component of liquid biofuel is green, renewable and carbon neutral, thereby reducing the carbon footprint of the energy being produced.

The biooil and pyro oil feedstocks and biocarbon feedstock, before being dispersed into a blended liquid biofuel produced in accordance with the various embodiments of the invention, generally have less inherent caloric value, as measured in BTUs per pound or per gallon, than the same unit of volume of petroleum based liquid fuel. Until now, there has been no reasonably practical method, beyond de minimis increases due to improved refining techniques, to increase the inherent caloric energy value of either bio fuel based liquids or petroleum based liquids. The novel liquid fuel resulting from the various embodiments of the invention where specially processed biocarbon or biochar solids are sufficiently micronized and dispersed or blended into a non-water based biofluid fuel base or petroleum hydrocarbon based fuel results in a combined higher inherent energy value per unit volume or weight and at the same time provides environmentally desired features to the blended product.

The liquid biofuel based on the biochar of the various embodiments of the invention is easier and safer for all purposes than a powdered, pelletized or cubed form of processed biomass to transport and store, deliver and convey, and may be used in directly in burners, misters, boilers, or gasifiers, compression ignition and combustion engines, and turbines that are designed to burn conventional petroleum distillates or liquid green energy oil derived fuels or solid coal boilers. The energy provided by such a fuel produces increased energy, gallon for gallon, or pound for pound, with a reduced carbon footprint, reduced atmospheric emissions and reduced residual left-over ash when compared to other solid raw biomass fuels and all other solid non-biomass fuels.

It is contemplated that the biofuel manufactured in accordance with the various embodiments of the invention may be used as a standalone fuel to be used in burners and engines such as diesel engines, or it may also be used to fuel a jet or combustion turbine engine. The biofuel can be blended with a bio-oil liquid for a 100% green liquid solution or a petroleum based fuel oil for an environmentally improved petroleum based fuel oil. It is also contemplated that the liquid biofuel may be used as an additive to petroleum based fuels, such as heavy fuel oil or bunker oil marine diesel fuel or to make renewable green carbon black oil, or green renewable activated carbon feedstock.

One example of such a use would be to incorporate the liquid biofuel of the various embodiments described above into low sulfur bunker fuel oil. Such low sulfur fuel currently sells for between $800 and $990 per ton. Liquid biofuel product in accordance with the embodiments of the invention would have insignificant amounts of minerals such as sulfur and would not remove or counteract or react adversely with any of the desired qualities of low sulfur bunker fuel oil or conventional bunker C heavy fuel oil including those related to lubricity, cetane rating, and the combustion components of low sulfur or conventional bunker fuel oil.

Liquid biofuel may be priced lower than petroleum based bunker fuel. It may be added to low sulfur bunker fuel oil such that it comprises, for example, 25% to 40% of the total volume of the fuel mix, thereby significantly reducing the cost of the combined fuel per gallon or per ton, while not compromising the efficacy of the primary bunker fuel oil component and without increasing any adverse effects of sulfur or other minerals, yet maintaining, or increasing, the energy value of the combination fuel. Even if this blended mix resulted in increased the consumption of the fuel oil mix to provide the same operating parameters for ship's engines, the increased amount of energy provided at a lower cost in the blend more than offsets the marginally increased consumption.

On a cost basis, the blended fuel can be mixed with conventional bunker fuel and can achieve a lowered overall sulfur percentage to enable more cost effective compliance with laws requiring reduced sulfur emissions of fuels consumed within 200 miles of a coastline. It is anticipated that savings of $150 to $200 per ton of fuel is possible by admixing the colloidal liquid biofuel into low sulfur bunker fuel oil, with savings of similar magnitude expected when mixed into conventional higher sulfur containing bunker C fuel.

The biochar colloid dispersion in accordance with the various embodiments of the invention may also be used to fortify the product known as Biodiesel. Biodiesel is generally regarded as having less energy density or less heating value than petroleum based diesel fuels. Dispersing a colloidal suspension of biochar in biodiesel can substantially increase the energy density of the biodiesel. For example, adding and dispersing approximately three pounds of biochar with a lower heating value net energy density of 10,000 BTU/pound or greater to a B100 biodiesel having a net lower heating value of 119,550 BTU/pound results in a fuel with a combined caloric value of 149,500 BTU/pound. This new colloid dispersion creates a fuel exceeding the net heating value of #2 diesel, which is between 130,000 and 142,000 BTU/pound.

Similarly, a biochar colloidal dispersion in accordance with the various embodiments of the present invention may also be used as an additive to heavy fuel oil or Bunker C fuel. Should the addition of the biochar result in increased viscosity of the Bunker C, that viscosity can be further controlled using conventional means, such as heating the Bunker C to improve flow, or through the use of Dimethyl Ether (DME) to reduce viscosity. Combining a biochar dispersion with Bunker C and using DME to reduce and control viscosity allows the formulator to enhance the Bunker C by dispersing larger amounts of biochar in the colloid, while maintaining a workable viscosity. Thus, the combination provides a fuel with increased heat or energy density/content at a lower price and with a workable viscosity than could otherwise be achieved through use of Bunker C alone.

Such a fuel would be capable of being used in a two cycle low speed Sulzer type diesel engine found in most ships currently. Alternatively, it could be misted and burned in an aero-derivative combustion turbine with or without pre-gasification. Such a fuel could also be misted and/or mixed and blended with other fuels and burned in conventional boiler applications or in direct fired or co-fired misted coal or diesel oil applications.

Other advantages of the liquid biofuel manufactured in accordance with the various embodiments of the present invention are that the combined fuel would not increase the known safety risks associated with liquid petroleum based fuels nor would it contribute to the risk of explosion of the combined fuels, either during use, storage or transportation. Furthermore, any spillage of the biofuel not yet combined with any petroleum based fuel will not result in any environmental contamination of air, soil or water. Moreover, because the particularized biomass biochar is dispersed in a non-aqueous solvent, such as a bio-oil, fuel oil or other suitable solvent, it eliminates storage, delivery, fuel moisture and blending problems that would otherwise result from using blended oil and water-based dispersions, such as water-based coal slurries.

Moreover, such a fuel is "green" in the sense that it is produced from grown plant matter and also considered renewable and sustainable because it is derived from biomass that is continuously produced. Furthermore, the production and use of biofuels in accordance with the various embodiments of the invention are environmentally protective because the raw biomass furnish, if not used in this manner, would decompose or otherwise simply be discarded, dumped into landfills or disposed of in other dry waste depositories. Further, since the raw biomass is not dumped into landfills, or otherwise left to simply decompose, the production of the novel biofuel of the embodiments of the invention reduces the proliferation of harmful environmental gasses such as methane, which is known to be twenty times more harmful to the atmosphere than carbon dioxide.

In another embodiment, the biochar colloidal dispersion of the present invention may be incorporated into the torrefaction and/or pyrolysis procedures. For example, a biochar colloidal dispersion produced using a procedure such as that shown in FIGS. 2-4 may be mixed with ground biomass to enable the biomass to be more easily pumped through pipes and then into a torrefaction reactor.

In yet another embodiment, the biochar colloidal dispersion may be heated using a heater and then mixed with the biomass. In this way, the heated biochar colloidal dispersion imparts heat to the biomass so that a heated biomass/dispersion mixture, which may be a slurry or sludge is provided to the reactor. In this embodiment the heated biochar colloidal dispersion may be characterized as a heat transfer fluid.

In one embodiment, the heater or heat exchanger that is used to heat the biochar colloidal dispersion heat transfer fluid is a structure to allow the use of molten salt as the heat source. The molten salt may be maintained at a temperature in the range of 700 to 1400 degrees Fahrenheit in a closed cycle pumping circuit, which may include a storage tank, preferably insulated. The molten salt is pumped using an appropriate pump from the storage tank, to the heat exchanger for heating the biochar colloidal heat transfer fluid, and back to the storage tank. In some embodiments the storage tank may be omitted but the molten salts needs to be kept above its freeze temperature.

While the use of molten salt is described in terms of heating the biochar colloidal dispersion, it will be understood that molten salt may be used as the heat source in any of the embodiments described herein.

The heated biochar colloidal dispersion may have a wide range to temperature, for example, from ambient temperature 700 degrees Fahrenheit.

Figure 5:
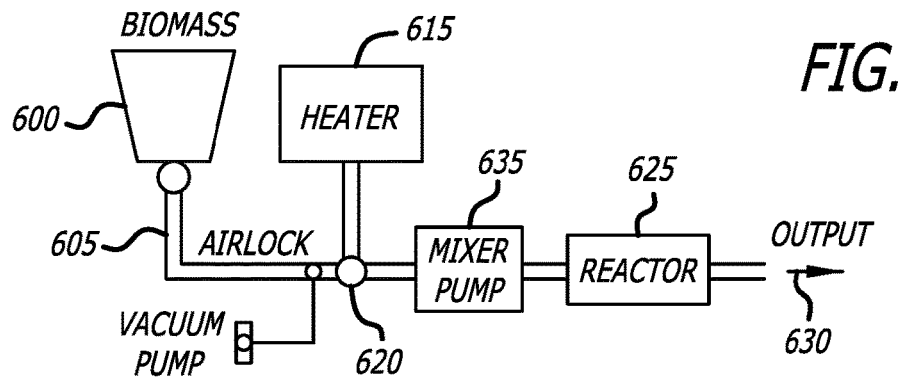
FIG. 5 is a graphical representation illustrating one embodiment of a system for carbonizing/torrefying a blend of uncarbonized biomass and biofuel such as a dispersion of torrefied biomass and petroleum or pyrolysis oil.

FIG. 5 illustrates one process for using torrefied biocarbon or biochar colloidal dispersion as a transfer fluid to transport unprocessed biomass through the torrefaction process. As illustrated, biomass from hopper 600 is transported to a mixer 620 where is it mixed with biochar colloidal dispersion. In one embodiment, the biochar colloidal dispersion is mixed with the biomass at room temperature, and then pumped by pump 635 into torrefaction reactor 625. Torrefied biochar colloidal dispersion and the torrefied biomass are output from the reactor at output 630. At this point, the torrefied biomass may be separated from the biomass/biochar colloidal dispersion slurry or sludge and reused in a closed cycle system. Those of ordinary skill in the art will understand that under certain conditions the amount of biochar colloidal dispersion in the recycling closed system may need to be replaced or topped up to keep the system in optimal operation condition. It will also be understood, while not shown in FIG. 5, molten salt may be used as the heating medium of the reactor 625.

In this embodiment, the biochar colloidal dispersion assists in heat exchange between the heated reactor and the biomass. This occurs because the biochar colloidal dispersion itself is a good heat exchange media, filling in the spaces that exists between the chips and chunks of the biomass particles. Processes gases, steam, and other unwanted gases may be removed from the slurry using known techniques. The process operates without substantially elevated pressure.

Figure 6A:
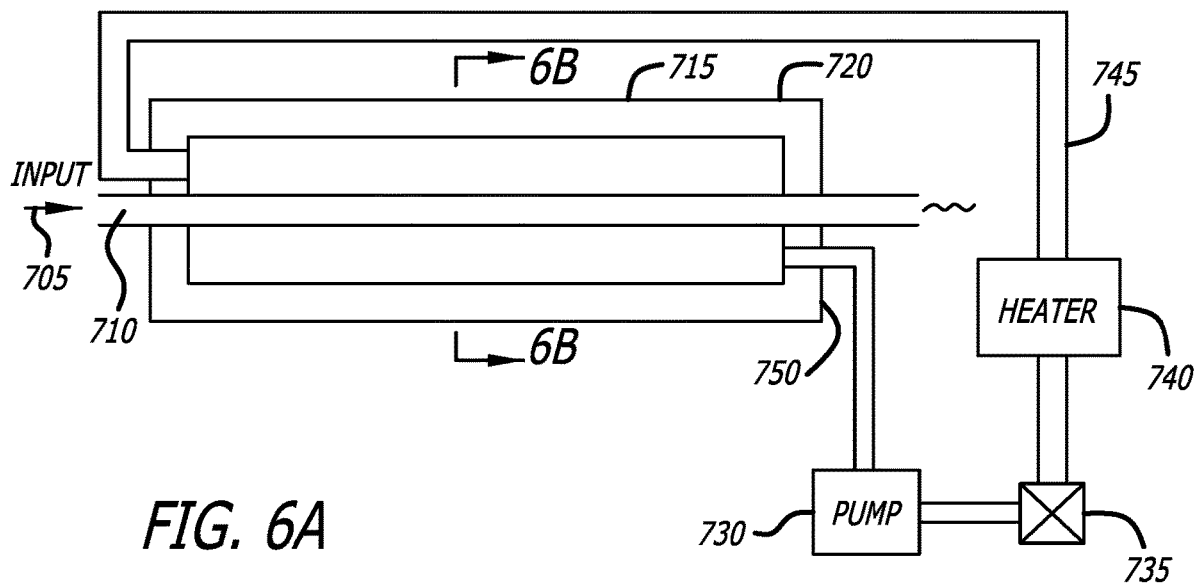
FIG. 6A is a graphical representation illustrating an embodiment of a continuous carbonization/torrefaction reactor in accordance with FIG. 5.
Figure 6B:
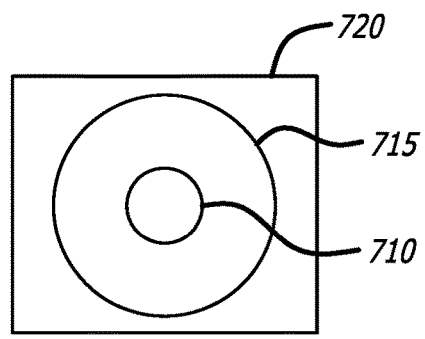
FIG. 6B is a cross sectional view of reactor of FIG. 6A.

In yet another embodiment, illustrated in part in FIGS. 6A and 6B, the torrefaction reactor may comprise a length of "pipe within a pipe" of adequate length to allow the biomass/biochar colloidal dispersion slurry or sludge to reach torrefaction temperatures and "cook" the slurry in a continuous manner. Once cooked, the torrefied biomass and biochar colloidal dispersion may be separated with the biochar colloidal dispersion being reused and the torrefied biomass being either used as is, or undergoing further processing as described above to be converted into biochar colloidal dispersion.

As illustrated in FIG. 6A, the pipe 710 through which the biomass/biochar colloidal dispersion is pumped may be surrounded by a larger pipe 715 FIG. 6B. This larger pipe 715 may be of sufficient diameter to allow large amounts of molten salt to be pumped through a substantial length of the piping at a large enough velocity so as to maintain a temperature sufficient to keep the salt in a molten state. Appropriate fittings are used attach the pipe 715 to supply pipe 745 and output pipe 750. In the embodiment illustrated, molten salt received from pipe 715 into pipe 750 flows into an input of pump 730. The molten salt is then pumped through a heater 740 to raise the temperature of the molten salt, which will be reduced during its travel through pipe 715 by exchanging heat from the molten salt into the biomass/biochar colloidal dispersion slurry or sludge. While the heater 740 is illustrated as being located between the output of pump 730 and pipe 745, the heater could be located along pipe 750 so that the molten salt is heated before it is input into the pump 730. In yet another embodiment, there may be multiple pumps and heaters disposed in the molten salt closed system to ensure that the temperature and flow of the molten salt stream is maintained. The molten salt system may also include one or more valves 735 as needed to control the flow of molten salt through the system, or to allow one or more sections of the system to be drained, repaired, or replaced or to store unused volumes of molten salt above its freezing point.

Figure 6C:
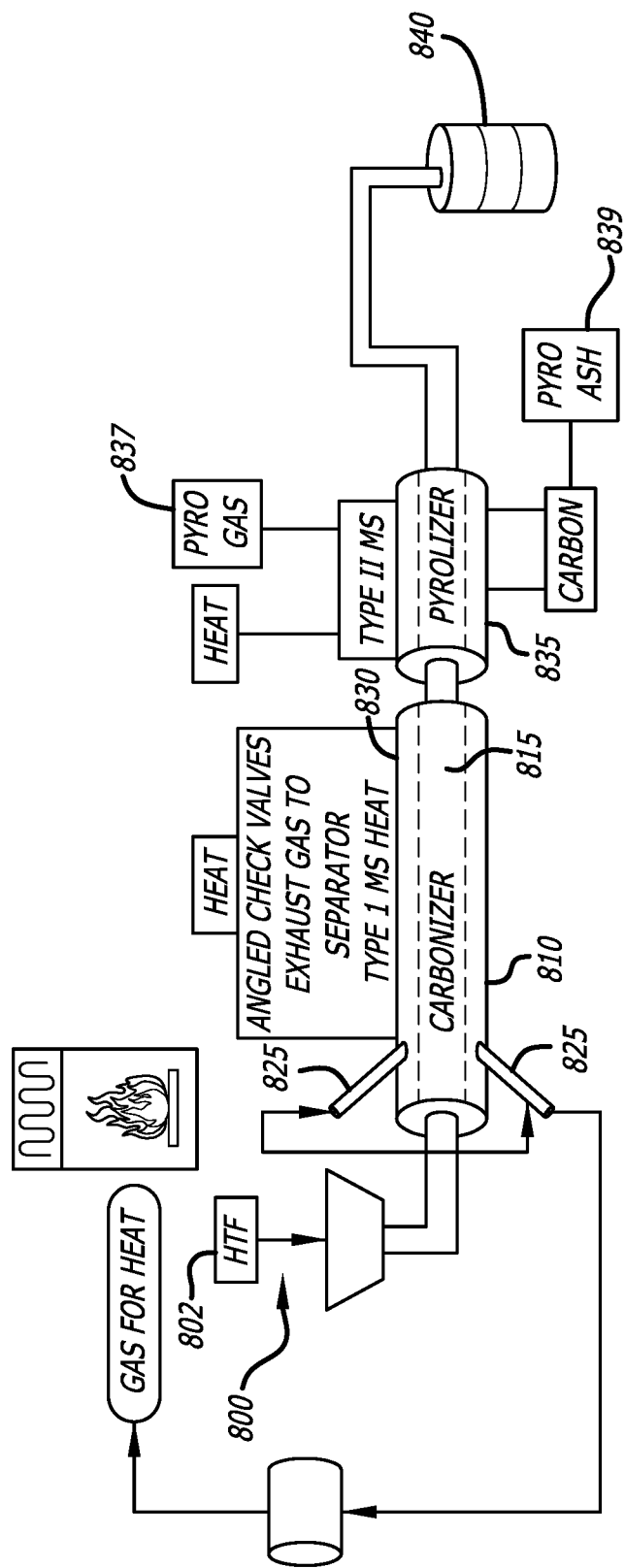
FIG. 6C is graphical representation of an embodiment of a continuous process utilizing the reactor of FIGS. 6A and B together with a pyrolysis reactor and associated accessories.

FIG. 6B is a cross section of pipe in a pipe reactor construction shown in FIG. 6C. The orientation of inner pipe 715 which contains the biomass/biochar colloidal dispersion within pipe 720 which contains the molten salt is clearly shown. Surrounding pipes 715 and 720 may be a housing 720. Housing 720 will typically be insulated to assist in reducing temperature loss of the molten salt due to contact with ambient air.

In one embodiment, biomass and biochar colloidal dispersion are combined and pumped into the reactor pipeline of FIG. 6A at room temperature. In various embodiments, the viscosity of the biochar colloidal dispersion may be adjusted to provide a viscous thick "crème" form that facilitates the transport of the biomass through the reactor system. Pumps having the capability of pumping extremely viscous "chunk" fluids are well known in the art, such as, for example, pumps used to pump concrete through large diameter hoses and pipes.

Once the biomass/biochar colloidal dispersion slurry enters the reactor of FIG. 6A, heat is exchanged from the molten salt into the slurry, where it is gradually heated until the slurry begins to torrefy. Factors such pipe diameters, pipe length, expected heat exchange rates, and flow rate through the pipe carrying the biomass/biochar colloidal dispersion, as well as the temperature of the molten salt, must be considered when engineering the pipe reactor so that the torrefaction process operates in a continuous way while accepting un-torrefied biomass/biochar colloidal dispersion in the input end and outputting torrefied biomass at the output end of the reactor. Such engineering factors are well known in the art.

After the torrefied biomass/biochar colloidal dispersion slurry passes out of the pipe reactor, the slurry may be pumped through a cooler/heat exchanger so that the slurry cools to a lower temperature so that the slurry does not combust when it comes into the presence of oxygen. The slurry output may be a viscous mixture of biochar colloidal dispersion and torrefied chunks of biomass (cellulose) in the form of chips or bits of fiber. The slurry may then be pumped through a blender or grinder to reduce the size of the torrefied biomass particles. The viscosity of the resultant slurry may then be adjusted as need by adding pyro-oil or bio-oil to the slurry.

As described above, the slurry of torrefied biomass and biochar colloidal dispersion may either be separated into dual streams, or may be further processed as a unified stream. For example, the torrefied biomass/biochar colloidal dispersion stream may be pumped into an another reactor pipe designed to provide the conditions necessary to convert the torrefied biomass/biochar colloidal dispersion into pyrolysis oil ("pyro-oil"). At the higher temperature reached by such a pyrolysis pipe generator, the biomass is pyrolyzed and the biochar colloidal dispersion in the slurry is gasified and can be condensed into pyrolysis oil.

Another advantage of the system described above is that the entire process is performed in the absence of oxygen in the system. This allows the torrefaction process to be performed without the biomass flashing into a fire. Furthermore, the entire process is performed with a minimum of moving parts where the flow of carbonized product is managed by pumps and where such product flow will not be jammed or impinged by moving parts in a reactor such as augers, drag conveyors, wheels or rotating cylinders.

Another embodiment of a continuous processor is illustrated in FIG. 6C. In this embodiment, biomass blended with heat transfer fluid 802 is pumped into a tube 815 within a tube 810 carbonizer 830. Heat is added to the outer tube 810 of the carbonizer 830 by circulating a heat transfer medium such as molten salt through the outer tube 810 to carbonize/torrefy the biomass/heat transfer fluid being pumped through the inner tube 815. Off gas from the carbonization/torrefaction process is extracted or vented through exhaust pipes 825, and can be recycled and burned for providing heat to the process.

After the biomass blend has been pumped through a sufficient length of the carbonizer 830, the unprocessed biomass is converted into carbonized biomass which then can flow into pyrolizer 835, whose output is condensed gas 837, non-condensible gas and ash 839 that can each be separated from the pyrolyzed stream. The pyrolyzed output may then be separated and cooled and the condensed gas stored as pyrolysis oil 840, the non-condensible gas used to refuel the heat required by the process itself and the ash removed to provide a useful end product such as a soil amendment.

As described above, not all the gas held in the inert atmosphere of the reactor resulting from the gasification of product feedstock entering the pyrolysis section of the reactor produces a gas that is ultimately condensed and reduced to a pyrolysis liquid. Some portion of that gas does not condense. That gas also has in its mix, some small portion of suspended solids regarded as ash and bio-chars solids. The ash and non-pyrolyzed solids including ash and bio-chars solids that result from pyrolysis are customarily separated from the pyrolysis liquid within the reactor or by diversion connected and appurtenant thereto by conventional filtration and separation means.

The solids removed may be used for another purpose including but not limited to activated carbon production, soil amendments and components of filtration devices. The non-condensed gas can be compressed for later use or can be redirected to the process of adding heat for further pre-drying of feedstock, or heating the heat transfer fluids used in processing of feedstock in the first pipe, or heating the heat transfer fluids and molten salts used in the second pipe in the process, or providing direct burning gas in a generator set providing electricity for the process of operating the pumps, valves, filters and other devices that are component to the reactor units, either individually or collectively. The non-condensed gas can be used to produce other fuels in a refiner, catalyst or tertiary reactor device. In many instances, the volume of gas produced in the process may exceed the needs of the process for creating or maintaining heat for the heat transfer fluids and the power generation needed by the system, and thus may be used for other purposes.

Pyrolysis liquid resulting from the various embodiments described herein often includes a mix of polymers of varying degrees that are sometimes acidic or unstable or contain too much moisture or emulsified moisture or unstable molecular components which leave the liquid with characteristics that are inconsistent, indeterminant, or undesirable. In some cases, the liquid becomes viscous and dense upon production or after the passage of time. When this occurs, various components of the liquid may settle out and phase into something different.

In many scenarios the nature of green renewable pyrolysis liquid in its present state is immaterial to its end use as a fuel for heat or power generation or as a polymer or component to further refinement. In some cases green renewable pyrolysis liquid is a more viscous liquid then conventional petroleum hydrocarbons, and it may often be stored and consumed in its resultant present state. However, the further management or refinement of the pyrolysis liquid can be more readily achieved by converting the pyrolysis liquid back into a gas where it can be altered, filtered or chemically managed into another more desired product and then left as a gas or condensed once again into a liquid. The various embodiments of this disclosure provide a means for quickly reconverting the pyrolysis liquid back into a gas and improving or modifying its chemical componentry. Alternatively, if it is simply desirable to be able to use the pyrolysis liquid in an engine that customarily burns gas or less viscous liquids, and no re-engineering of the power generation componentry is sought, the means for quickly converting the liquid into a gas for compression or transmission into a power generating engine in a simple and uncomplicated manner may also be accomplished by utilizing the embodiments of the reactor system disclosed herein.

Both non-condensable gas and gasified pyrolysis gas have been referred to as syn-gas, short for synthetic gas. But that term, while valid and properly applied, does not denote that the gas is made from this system using green, sustainable, biomass derived feedstocks and is free from petroleum hydrocarbons. The various embodiments of this disclosure may be applied to the conversion of solids from plants into green sustainable gases for energy and chemical refinement. The syn gas produced by the systems and methods described in this disclosure is not derived from petroleum hydrocarbons. Similarly, the liquid pyrolysis fluids produced by the systems and methods of this disclosure may be produced from gasification of coal or non-green material feedstocks. Advantageously, the syn-gas derived from systems and methods of this disclosure can be used to create other gases such as hydrogen fuel, dimethyl ether fuel, or many other fuels and chemicals, all of which are 100% green and sustainable or the pyrolysis gas may be used as it is created.

Although the further processing of pyrolysis fluids or gas resulting from all of the various embodiments disclosed herein, one example of such a process is described herein with regards to the embodiments described with reference to FIGS. 6A, 6B, and 6A.

Referring again to FIGS. 6A, 6B, and 6C, pyrolysis liquid can be channeled or piped in the pipe 710 or from either a point of storage as a liquid or directly from the last segment of the smaller pipe 701 into a separate but further production operation into a tertiary reactor, such as, for example, and not limited to, pyrolizer 835, shown in FIG. 6C. The tertiary reactor is a similarly configured component as the initial reactor (s) to the system which uses as a primary heat source either the same molten salts from the initial reactor (s) operations or a higher temperature configured molten salts liquid circulated in an outer pipe configuration to further add higher temperature heat to either the pyrolysis gas, not yet condensed into liquid, and non-condensable gas. The tertiary reactor can introduce pyrolysis liquid from storage into the smaller pipe having a first diameter surrounded by a second pipe (such as that illustrated in FIGS. 6A and 6B) having a second, larger, diameter where within the same configured space or gap between the two pipes, molten salts is circulated from a reservoir by pumps. The movement of the pyrolysis liquid in the first pipe is accomplished by pumps and the removal of any oxygen is accomplished by pumps and membrane filters, within the traversing of such liquid it is possible to expose the liquid being gasified to catalysts and filters that can be provided with metals or minerals such as zeolites, which can be used to further remove or alter the molecular makeup of the liquid being gasified. The gas may then be converted to hydrogen gas, dimethyl ether or other desired gases component to the constitution of the feedstock by conventional means.

The liquids or gases inside the first pipe in the tertiary reactor are kept in an environment without oxygen to prevent combustion. The removal of oxygen is accomplished in part by the operation of vacuum pumps and if desired the introduction of inert gas that will not interfere with or cause the undesired application or use of the product in the first pipe. The movement of the combination of pyrolysis gas and non-condensed gas and inert gases within the first, smaller, pipe is accomplished by pumps, within the traversing of such gases, It is possible if desired to provide the movement over and through catalysts, filters, and membranes, of metals or minerals such as magnesium or zeolites, which can be used to further remove or alter the molecular makeup of the gases or to clean and filter or separate components of the gases. The primary use of the resultant gases are as combustion gases for example in heat and power generation in turbines, compression ignition engines or conventional boilers.

Figure 7:
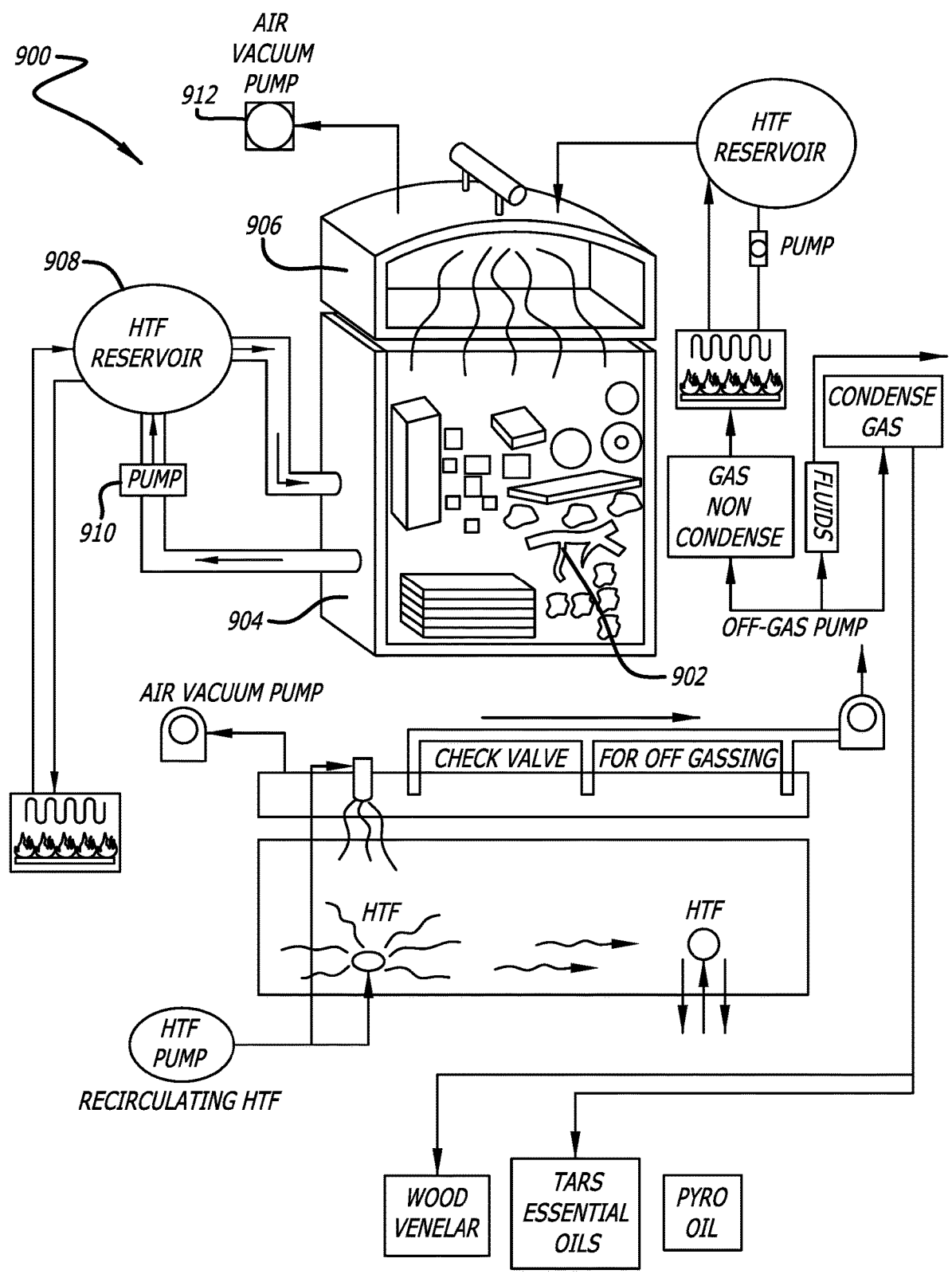
FIG. 7 is a graphical representation of an embodiment of the present invention illustrating a carbonization/torrefaction reactor and associated sub-systems for processing uncarbonized biomass in a batch mode.

FIG. 7 is a graphic depiction of an embodiment 900 in which the feedstock for the carbonization process is static and does not move, enabling a batch mode of carbonization in accordance with various principals of the present invention.

In this embodiment, cellulose 902 of non-uniform size is loaded into a container or tank 904. The container or tank is then sealed by applying a lid 906 to the container or tank. Heated heat transfer fluid 908, such as, for example, GRC88, is pumped (910) into the sealed container to immerse the non-uniform cellulose in the tank. The heat transfer fluid is then recycled through the interior of the tank and further heated to bring the temperature of the blend within the tank to a temperature sufficient to induce carbonization/torrefaction of the non-uniform cellulose biomass in the tank. Air present in the tank or container can be extracted, along with off gas produced by the carbonization process by a vacuum pump 912. The off gas may be further processed into various oils, fluids and solids or used to perpetuate the heat transfer process itself.

Figure 8:
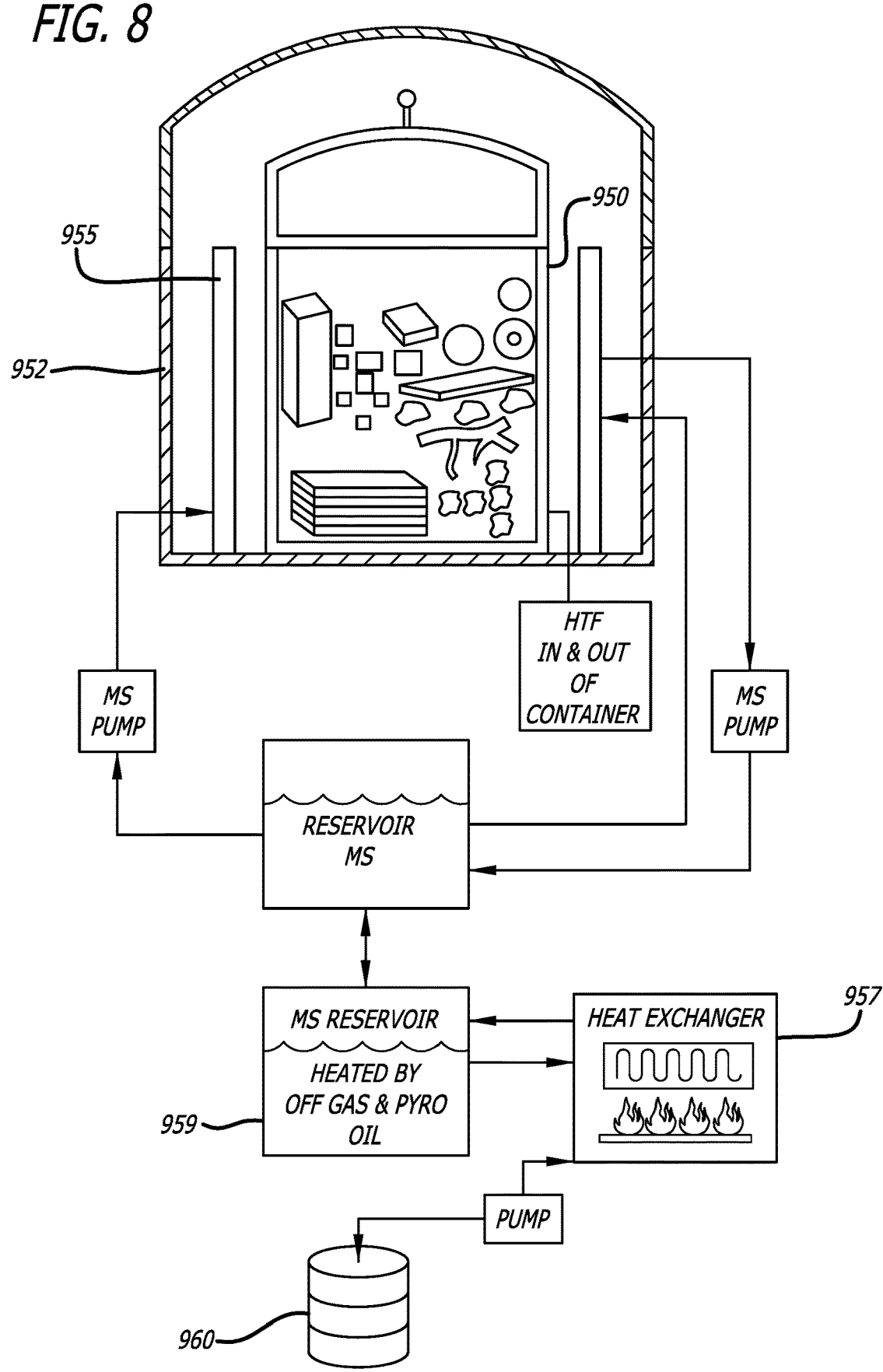
FIG. 8 is a graphical representation of an embodiment of the invention of FIG. 7 that is heated using a recycling molten salt heat transfer fluid to provide heat energy to the carbonization/torrefaction reactor.

FIG. 8 is a graphic depiction similar to the illustration in FIG. 7, but uses a recycling molten salt system to provide heat for the carbonization/torrefaction process. In this embodiment, the sealed tank or container 950 containing the uncarbonized cellulose is in thermal communication with a recycling molten salt bath or radiator 955. The salt bath or radiator is insulated 952 to direct the heat energy contained in the molten salt into the reactor tank or vessel. The heater 957 for the molten salt may be fueled using off gas extracted from the reactor tank or container, pyrolysis oil, or other fuel 959, 960. The circulation process is accomplished with few to no moving parts as the fluids are pumped and the contents of the reactor tank or vessel remain static.

Figure 9:
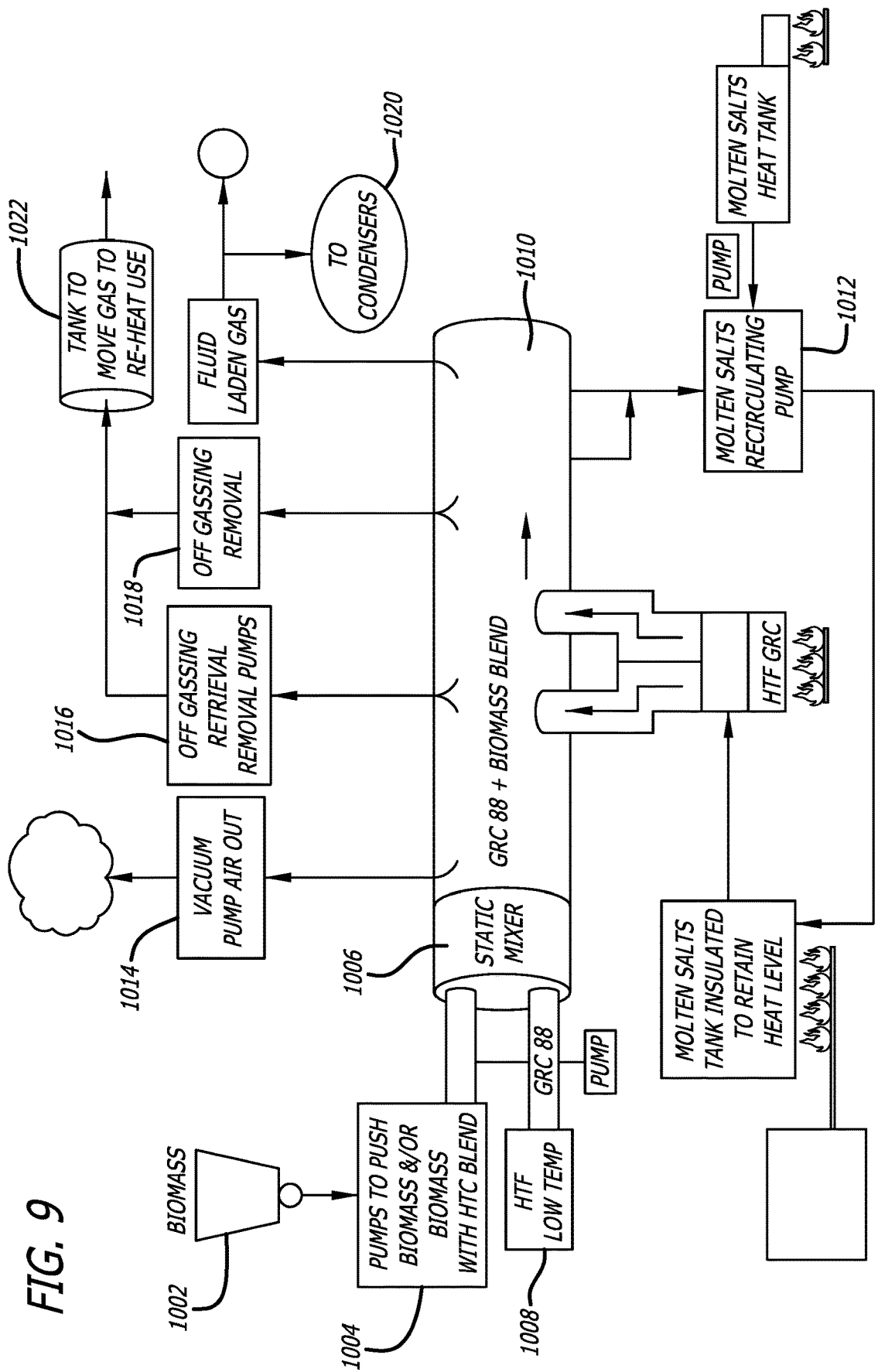
FIG. 9 is a graphical representation of an embodiment of the invention illustrating details of a continuous carbonization/torrefaction reactor.

FIG. 9 is a graphic diagram of one embodiment 1000 of a continuous process for torrefying biomass as described above. Biomass 1002 and heat transfer fluid 1008 such as, for example, GRC88, are combined by pumping 1004 them into a static mixer 1006. The heat transfer fluid lubricates flow of the biomass through the process. This heat transfer fluid may be at a temperature that, even if elevated above ambient temperature, is not so high as to induce combustion of the raw biomass.

In order to provide heat (or additional heat) to the reactor 1010, a pump 1012 recycles a heat transfer fluid, such as, for example, a circulating flow of molten salt, through either the space between walls of a tube in tube type reactor 1010, or through the walls of the of the reactor by way of a radiator or heat exchanger in thermal communication with the walls or the reactor. From the onset the flow of both biomass and heat transfer fluid should fill the void such that no accumulations of air occur and a vacuum 1014 on the gasses is constantly being drawn to prevent pressure build up in the reactor. Various openings in the reactor may be used to extract steam and off gases 1016, 1018 from the interior of the reactor. In a continuous process such as illustrated, various fractions of off gasses may be extracted using different vents along the length of the reactor. If the off gases contain moisture, they may be directed to a condenser 1020 to remove the moisture. As described above, the off gas may be used for various purposes, such as by burning outside the reactor itself to provide heat 1022 for either the heat transfer fluid within the blend of biomass being torrefied or to heat the molten salts.

Figure 10:
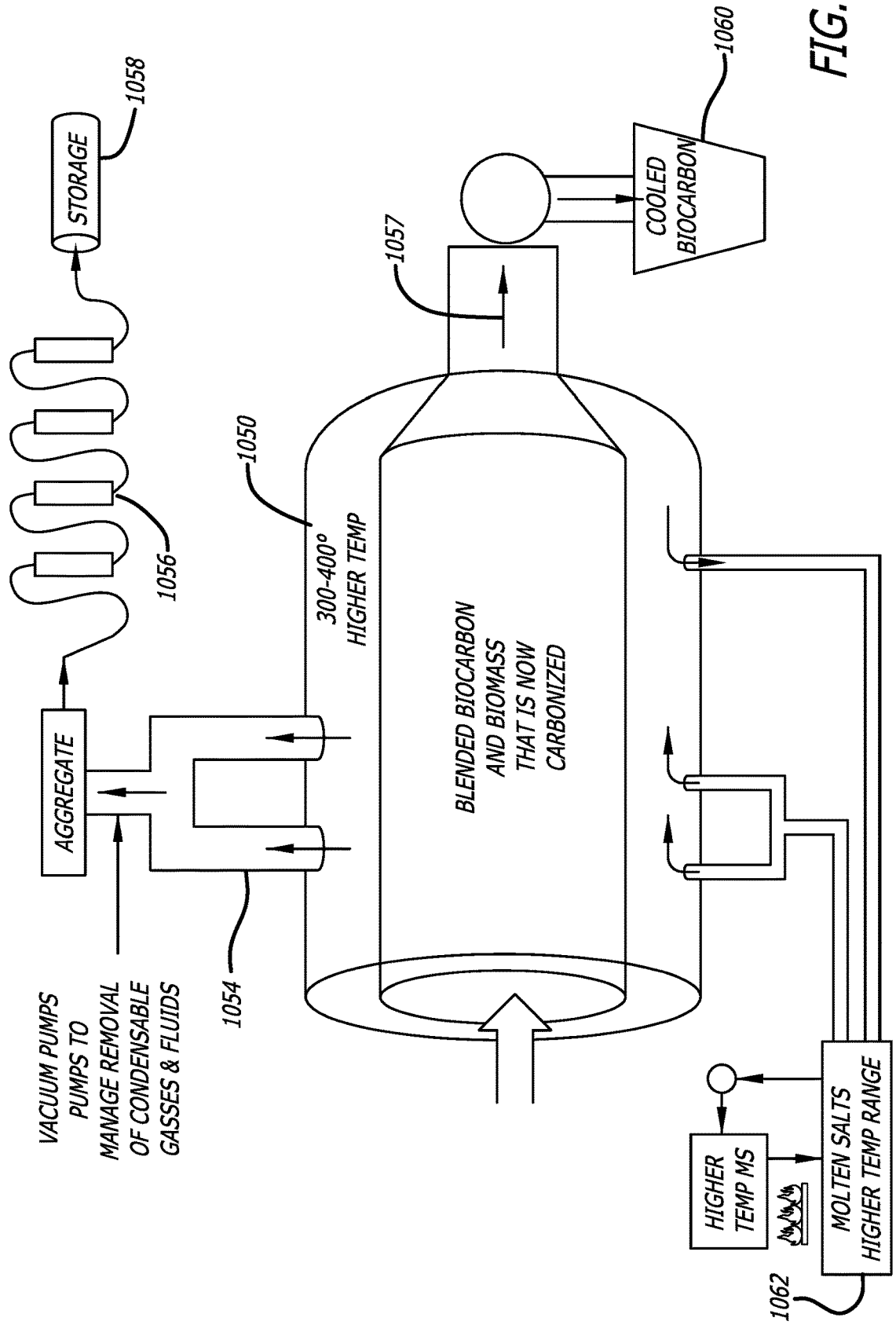
FIG. 10 is a graphical representation of an embodiment of the invention illustrating details of a continuous pyrolysis reactor that may be used in conjunction with the continuous carbonization/torrefaction reactor of FIG. 9.

FIG. 10 is a graphic diagram illustrating a pyrolizer in accordance with the principles of the present invention. After being processed by the process reactor illustrated in FIG. 9, the output stream of that reactor, which now includes a carbonized biomass and heat transfer fluid blend 1052, is flowed through a pyrolysis reactor 1050. As before, off gas may be extracted 1054 and either used for heating or condensed 1056 to provide pyrolysis oil that may be stored 1058 or used for heating or combined with carbonized biomass. Molten salt 1062 at a temperature sufficient to heat the reactor and carbonized biomass blend to a level sufficient to pyrolyze the blend may be used to heat the pyrolysis reactor. The output 1057 of the pyrolizer is segregated and cooled and stored 1060 for future use either as a fuel or as a heat transfer fluid.

Figure 11:
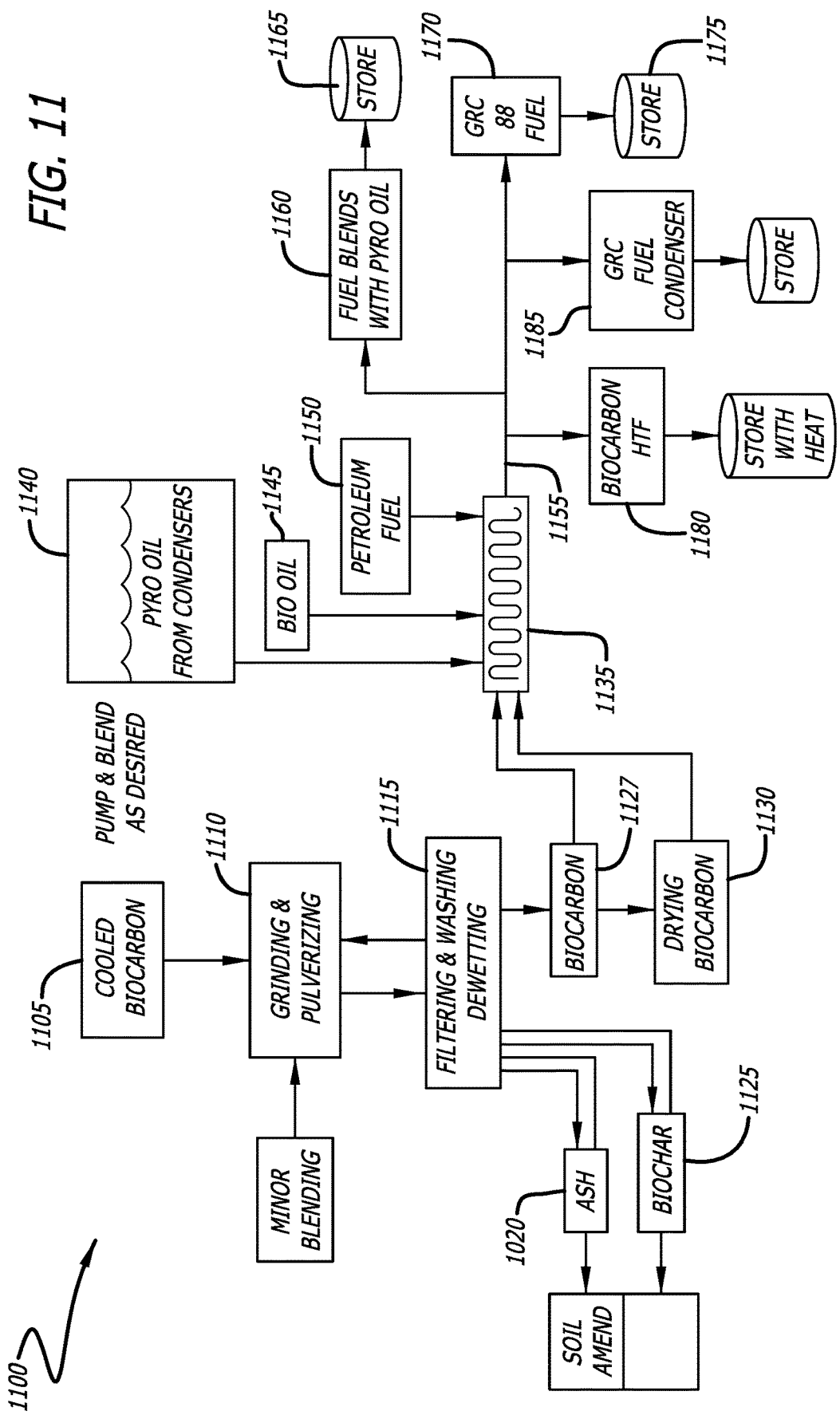
FIG. 11 is a graphical representation of an embodiment of the invention illustrating various process that can be carried out on processed biomass output from the reactors of FIGS. 9 and 10.

FIG. 11 is a block diagram illustrating one embodiment 1100 of a process for further processing the cooled biocarbon from either the carbonization or pyrolization process described above. The cooled biocarbon 1105 is ground, filtered 1110, washed and de-wetted 1115, and then processed to separate out ash 1120 and other unwanted impurities 1125. The filtered biocarbon 1127 may be further dried 1130, and then transported, preferably by pumping, to a static mixer or mixers 1135, wherein bio-oil, pyrolysis oil, or petroleum fuel oil, or all of them, are mixed with the dried biocarbon and then further ground or processed through appropriate particle creation machines. The output of the mixer or mixer-blenders provides a bio fuel that is very low moisture, has high energy value, and is adapted to various uses. For example, it may be further blended with pyrolysis oil 1160 and stored, formed into a dispersion such as GRC88 fuel 1170 and stored 1175, formed into a heat transfer fluid 1185, or other blends or mixtures 1180 that are usable as a green sustainable heat or combustion source.

Figure 12:
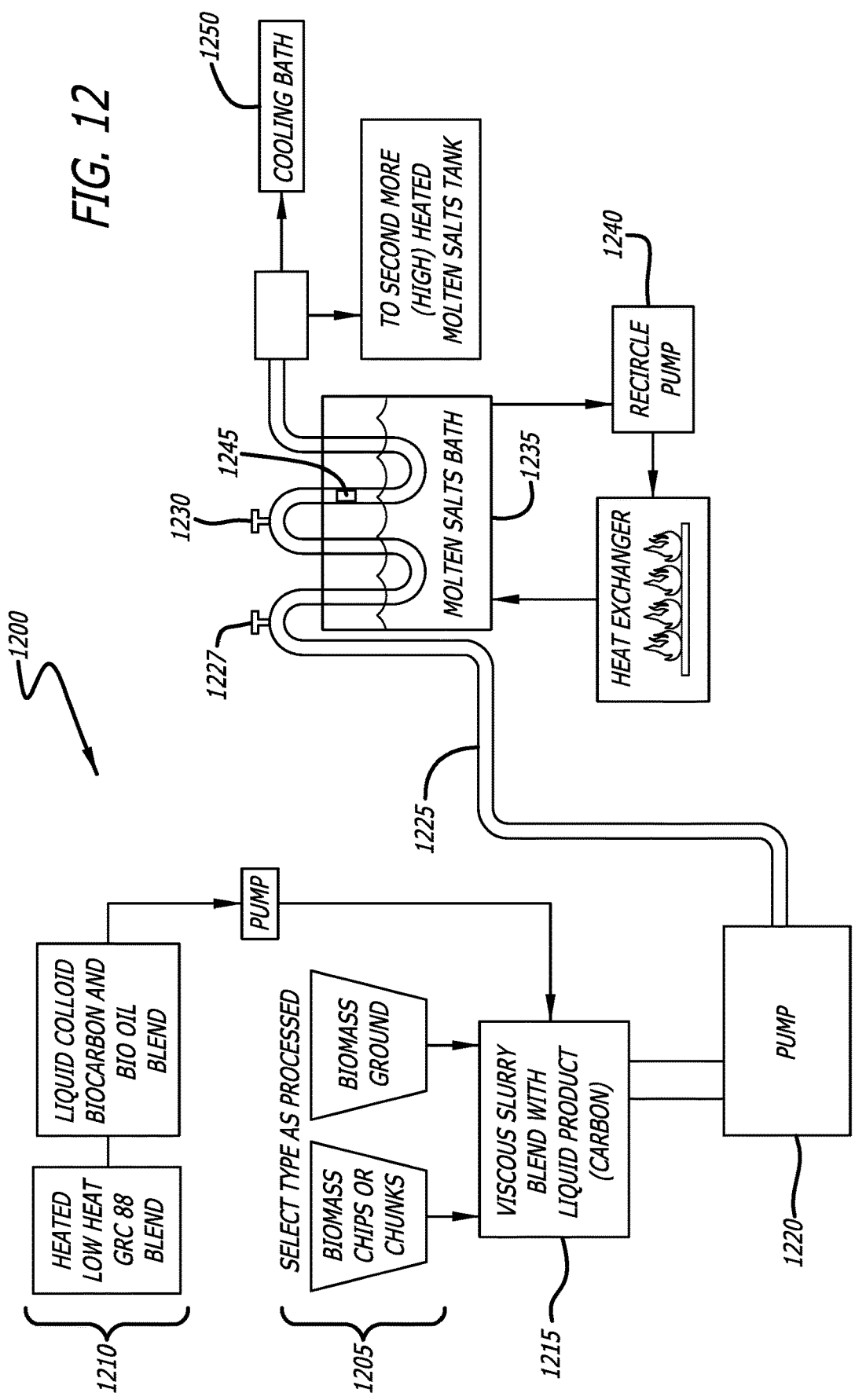
FIG. 12 is a graphical representation of an embodiment of the invention illustrating a continuous process for producing carbonized/torrefied biomass by pumping a blend of biomass and heat transfer fluid through a pipe or channel immersed in a tank, vat, or container filled with molten salt.

FIG. 12 is a graphic diagram illustrating one embodiment 1200 of a continuous torrefaction/carbonization process wherein the blend 1215 of uncarbonized biomass 1205 and heat transfer fluid 1210 does not flow through a tube in a tube type reactor, but is pumped 1220 through a pipe or enclosed channel 1225 that is configured to have a portion that passes into or through a molten salt tank or bath 1235. In this embodiment, biomass 1025 and heat transfer fluid 1210 are blended together 1215 and then pumped through a pipe using a heavy duty pump 1220 such as, for example, a modified concrete pump. As with other embodiments described above, the contents of the molten salt bath are recycled using an appropriate pump 1240, and the temperature of the recycled molten salt is maintained or adjusted with a heater, which may use off gas, natural gas, or other fuels for generating the heat necessary to heat the molten salt stream.

As described above, heat from the molten salts is conveyed through the wall of the pipe or enclosed channel into the biomass product flowing within the pipe or channel until it is torrefied and carbonized to the extent desired. The product being processed may be processed in a direct flow through the reactor, or may be recirculated through the reactor in one or more passes until the desired level of carbonization is achieved. The product may be mixed in the pipe during processing, such as, for example, a static mixer 1245. The product may then be pumped into a cooling zone 1250 where it is taken to a reduced temperature such the product will not ignite or combust when exposed to air. Various pumps 1227, 1230 and other means may be used to extract and/or vent off gases from the biomass blend as it is processed. The gas output of the process may be further processed to generate pyrolysis oil, or it may be cooled.

Figure 13:
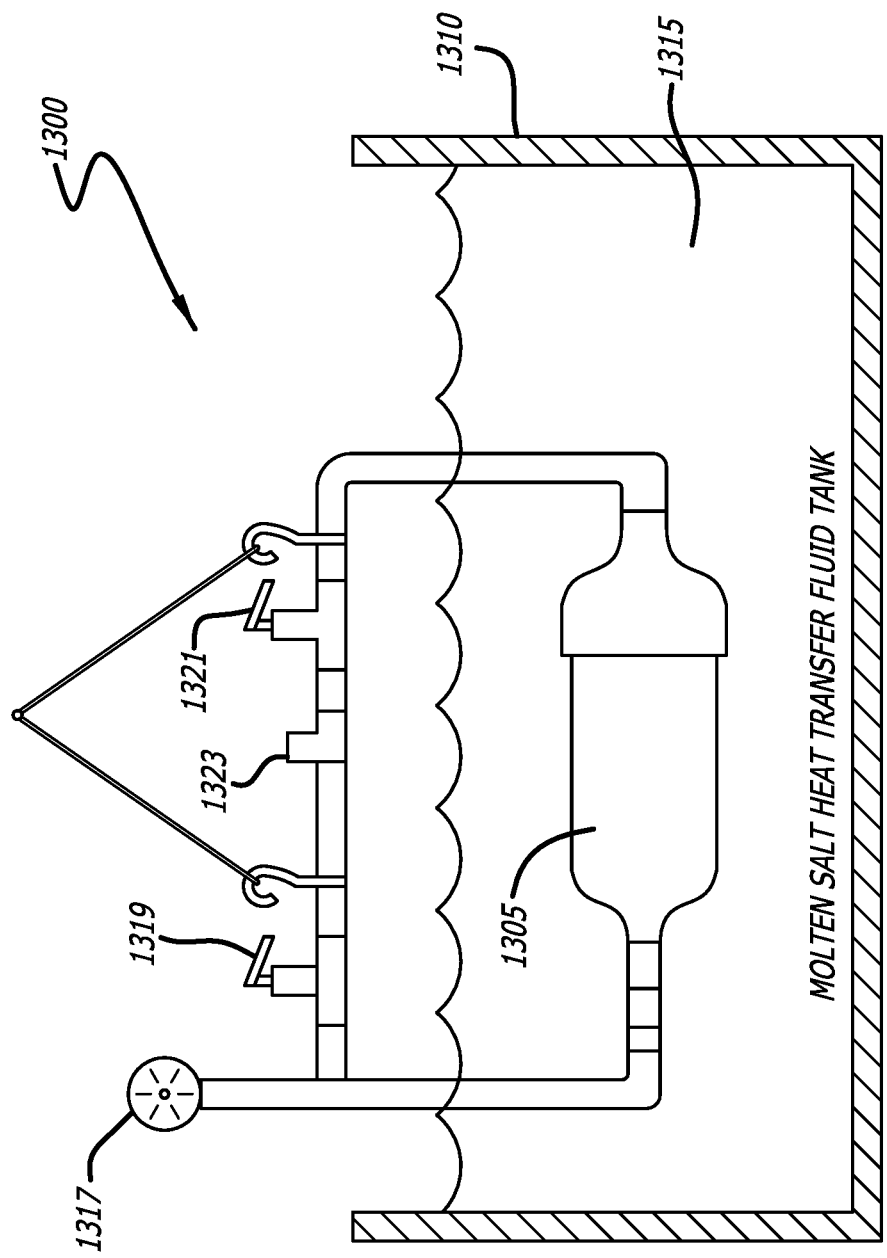
FIG. 13 is a graphical representation of an embodiment of the invention illustrating reactor that can be used to produce carbonized/torrefied biomass in a batch mode.

FIG. 13 is a graphical depiction of another embodiment 1300 of a carbonizer/torrefier in accordance with various principles of the present invention. A reactor vessel 1305 is stuffed with uncarbonized biomass. The uncarbonized biomass may be placed in the reactor alone, or it may be combined with heat transfer fluid, such as, for example, GRC88 green fuel. The reactor is sealed, and lowered into a vat or tank 1310 filled with a second heat transfer fuel 1315, such as, for example, molten salt at a temperature sufficient to induce torrefaction. In this illustrative example, the molten salt is maintained at a temperature of approximately 650 degrees centigrade. Various pumps 1317, vents 1323, valves 1319, 1321 are used to control the process and extract off gas as needed.

In another embodiment, a suitable liquid, such as pyro oil, may be added to the biocarbon (torrefied biomass) after torrefaction. The additional liquid may be added prior to or after the biocarbon is particulated. After the liquid is added, further processing may be carried out polymerize the liquid so as to bind the biocarbon particles together and if desired compress them into a more dense matrix. As will be apparent, the biocarbon may be formed into a desired shape, such as, for example, an anode, granules, crumbs, small or large cubes or balls, mini-tubes, micro-tubes, pellets, briquettes or mini-briquettes, or the like and such shape will be maintained by the polymerized liquid binder while the shaped biocarbon is stored, shipped, or used.

One advantage of the various embodiments of the present invention, especially when the static tank or vessel process is used, is that the process may be used to carbonize or pyrolyze used rail road ties and sleepers, used boat and pier dock planks, old telephone poles and cross arms, old bridge timbers, old cooling tower wood components, and old treated decking. The disposal of these types of 'treated wood' is very difficult because they are often treated with creosote and coal tar, copper chromium arsenate, bromates, bromides, Wolman salts, and other preservatives. Additionally, they may have imbedded metal, spikes, nails, bolts, cable and other metallic material that is typically removed or separated from the wood before processing. Such removal and separation is difficult, expensive and problematic. Furthermore, the advantages allow the safe processing of wood that is salvaged from structures destroyed or damaged during hurricanes or flooding often has been submerged in sewage or contaminated water, or has been painted with lead based paint.

The various embodiments of the present invention are capable of accepting these types of woody biowaste as feedstock for carbonization and or pyrolization. Where the feedstock is ground up or is in small chunks, it can be used as feedstock for the continuous processing embodiments, and if it provided in large chunks, piles or poles, it can be processed using the static embodiments of the present invention. Advantageously, these feedstocks are carbonized and/or pyrolyzed at such high temperatures that the process removes the biological toxins and changes the chemistry or chemical treatment components sufficiently to enable disposal or repurposing as fuel, burial as a soil amendment, disposal in a dump.

While particular embodiments of the present invention have been described, it is understood that various different modifications within the scope and spirit of the invention are possible. The invention is limited only by the scope of the appended claims.

I claim:

1. A method of making a biofuel based on renewable biomass feedstock, comprising:
   receiving solid biomass feedstock;
   combining the solid biomass feedstock with a colloidal dispersion of solid biocarbon in a liquid dispersion medium into a first blend; and
   pumping the first blend through a first reactor being defined by a length of first pipe having a first diameter, the first reactor being surrounded by a second pipe having a second diameter larger than the first diameter, the second pipe being supplied with a continuous flow of heat exchange fluid, the length of the first pipe having an input end for receiving the first blend, and an output end for outputting a second blend of torrefied biomass and biocarbon colloidal dispersion generated within the length of the first pipe.

2. The method of claim 1, wherein the heat exchange fluid is molten salt.

3. The method of claim 1, further comprising particulating the second blend to have a particle distribution in the range of 10 micron to 100 nanometers.

4. The method of claim 3, wherein the particle distribution has an average particle size of 200 nanometers to 400 nanometers.

5. The method of claim 1, wherein the torrefied biomass is friable.

6. The method of claim 1, wherein the solid biomass feedstock includes waste from a process that produces a combustible liquid from raw biomass.

7. The method of claim 1, wherein generating the second blend produces a low moisture biocarbon, a condensable gas and a liquid component.

8. The method of claim 7, wherein the condensable gas is further processed to produce a mixture of suspended solids and non-condensed gas.

9. The method of claim 8, wherein the suspended solids are further processed to produce biochar, carbon black, fertilizer, or activated carbon.

10. The method of claim 8, wherein the non-condensed gas is combustible.

11. The method of claim 7, wherein the liquid component is a pyrolysis liquid.

12. The method of claim 1, wherein the second blend is inputted into a second reactor.

13. The method of claim 12, wherein the second reactor is heated by a second heat exchange fluid, the second heat exchange fluid being a molten salt.

14. The method of claim 11, wherein the pyrolysis liquid is stored in a storage container.

15. The method of claim 14, wherein the stored pyrolysis liquid is provided as an input to a second reactor for further processing.

16. The method of claim 1, wherein the first blend includes coal or non-biomass material feedstocks.

\* \* \* \* \*